(12) United States Patent
Webster et al.

(10) Patent No.: US 8,077,592 B2
(45) Date of Patent: Dec. 13, 2011

(54) PACKET PROCESSING SYSTEMS AND METHODS

(75) Inventors: Mark A. Webster, Indian Harbor Beach, FL (US); Michael J. Seals, Melbourne, FL (US)

(73) Assignee: Intellectual Ventures I LLC, Wilmington, DE (US)

( * ) Notice: Subject to any disclaimer, the term of this patent is extended or adjusted under 35 U.S.C. 154(b) by 1121 days.

(21) Appl. No.: 11/186,260

(22) Filed: Jul. 21, 2005

(65) Prior Publication Data

US 2006/0002361 A1 Jan. 5, 2006

Related U.S. Application Data

(63) Continuation-in-part of application No. 11/159,812, filed on Jun. 22, 2005.

(60) Provisional application No. 60/581,358, filed on Jun. 22, 2004, provisional application No. 60/589,594, filed on Jul. 21, 2004.

(51) Int. Cl.
*H04J 9/00* (2006.01)

(52) U.S. Cl. ........ 370/204; 375/346; 375/343; 375/342; 375/267; 375/347; 370/208; 370/343; 370/480

(58) Field of Classification Search .................. 370/210, 370/267, 347
See application file for complete search history.

(56) References Cited

U.S. PATENT DOCUMENTS

| | | | |
|---|---|---|---|
| 6,574,237 B1 | 6/2003 | Bullman et al. | 370/465 |
| 6,754,170 B1 * | 6/2004 | Ward | 370/208 |
| 6,754,195 B2 | 6/2004 | Webster et al. | 370/335 |
| 6,785,341 B2 | 8/2004 | Walton et al. | 375/267 |
| 6,842,487 B1 | 1/2005 | Larsson | |
| 6,850,481 B2 | 2/2005 | Wu et al. | 370/208 |
| 6,862,271 B2 | 3/2005 | Medvedev et al. | 370/329 |
| 6,904,550 B2 | 6/2005 | Sibecas | |
| 7,272,109 B2 * | 9/2007 | Webster et al. | 370/208 |
| 7,310,304 B2 * | 12/2007 | Mody et al. | 370/208 |
| 7,444,134 B2 * | 10/2008 | Hansen et al. | 455/412.1 |
| 7,499,504 B2 | 3/2009 | Soffer | |
| 7,522,514 B2 * | 4/2009 | Tzannes et al. | 370/210 |
| 7,668,258 B2 | 2/2010 | Webster et al. | |
| 7,742,388 B2 * | 6/2010 | Shearer et al. | 370/204 |
| 2001/0053143 A1 | 12/2001 | Li et al. | |
| 2002/0118727 A1 | 8/2002 | Kim et al. | |
| 2002/0136276 A1 * | 9/2002 | Franceschini et al. | 375/148 |
| 2002/0181390 A1 | 12/2002 | Mody et al. | |
| 2003/0012160 A1 | 1/2003 | Webster et al. | 370/335 |
| 2003/0016621 A1 | 1/2003 | Li | 370/203 |
| 2003/0072284 A1 | 4/2003 | Webster et al. | 370/335 |
| 2003/0185241 A1 | 10/2003 | Lu et al. | 370/476 |
| 2004/0047284 A1 | 3/2004 | Eidson | |
| 2004/0105512 A1 | 6/2004 | Priotti | |
| 2004/0266339 A1 | 12/2004 | Larsson | |
| 2005/0180315 A1 * | 8/2005 | Chitrapu et al. | 370/208 |

(Continued)

OTHER PUBLICATIONS

Shearer, et al., "Packet Generation Systems and Methods," having U.S. Appl. No. 11/185,665, filed Jul. 20, 2005.

(Continued)

*Primary Examiner* — Charles Appiah
*Assistant Examiner* — Randy Peaches

(57) ABSTRACT

Various packet processing systems and methods are disclosed. One method embodiment, among others, comprises providing a legacy long training symbol (LTS), and inserting subcarriers in the legacy LTS to form an extended LTS (ELTS).

31 Claims, 26 Drawing Sheets

U.S. PATENT DOCUMENTS

| | | | |
|---|---|---|---|
| 2005/0233709 A1* | 10/2005 | Gardner et al. | 455/101 |
| 2005/0237988 A1 | 10/2005 | Webster et al. | |
| 2005/0271157 A1 | 12/2005 | Van Zelst et al. | |
| 2006/0176968 A1 | 8/2006 | Keaney et al. | |

OTHER PUBLICATIONS

IEEE Std 802®-2001, "802® IEEE Standard for Local and Metropolitan Area Networks: Overview and Architecture," IEEE Computer Society, Mar. 8, 2002.

Manoneet Singh, et al. and Bruce Edwards, et al., "WwiSE proposal: High throughput extension to the 802.11," IEEE 11-04-0886-00-000n, Aug. 13, 2004.

Syed Aon Mujtaba, "TGn Sync Proposal Technical Specification," IEEE 802.11-04/889r0, Aug. 13, 2004.

Aon Mujtaba, Adrian P. Stephens, Alek Purkovic, Andrew Myles, Brian Johnson, Daisuke Takeda, Darren McNamara, Dongjun (DJ) Lee, David Bagby, Eldad Perahia, Huanchun Ye, Hui-Ling Lou, James Chen, James Mike Wilson, Jan Boer, Jari Jokela, Jeff Gilbert, Joe Pitarressi, Jorg Habetha, John Sadowsky, Jon Rosdahl, Luke Qian, Mary Cramer, Masahiro Takagi, Monisha Ghosh, Nico van Waes, Osama Aboul-Magd, Paul Feinberg, Pen Li, Peter Loc, Pieter-Paul Giesberts, Richard van Leeuwen, Ronald Rietman, Seigo Nakao, Sheung Li, Stephen Shellhammer, Takushi Kunihior, Teik-Kheong, Tomoko Adachi, Tomoya Yamaura, Tsuguhide Aoki, Won-Joon Choi, Xiaowen Wang, Yasuhiko Tanabe, Yasuhiro Tanaka, Yoshiharu Doi, Yichi Morioka, Youngsoo Kim, "TGn Sync Proposal," IEEE 802.11-04/888r0, Aug. 13, 2004.

VK Jones, Neil Hamady, Jason Trachewsky, Michael Seals, Stephan ten Brink, George Vlantis, Sean Coffey, "WwiSE IEEE 802.11n Proposal," IEEE 802.11-04/0935r3, Sep. 16, 2004.

Supplement to IEEE Standard for Information technology—"Part 11: Wireless LAN Medium Access Control (MAC) and Physical Layer (PHY) specifications: High-speed Physical Layer in the 5 GHZ Band," IEEE std 802.11, 1999 Edition.

U.S. Appl. No. 11/121,661, filed May 4, 2005, and entitled "Cyclic Diversity Systems and Methods."

U.S. Appl. No. 11/159,812, filed Jun. 22, 2005, and entitled "Legacy Compatible Spatial Multiplexing Systems and Methods."

U.S. Appl. No. 11/185,665, filed Jul. 20, 2005, and entitled "Packet Generation Systems and Methods."

International Preliminary Report on Patentability for PCT/US2005/022249, issued Dec. 28, 2006.

International Preliminary Report on Patentability for PCT/US2005/025832, issued Jan. 23, 2007.

International Search Report and Written Opinion for PCT/US2005/025594 mailed Jul. 7, 2008.

International Search Report and Written Opinion for PCT/US2005/25832, mailed Apr. 18, 2006.

International Search Report and Written Opinion for PCT/US2005/022249 dated May 15, 2006.

International Preliminary Report on Patentability for PCT/US2005/025594, issued Mar. 3, 2009.

IEEE P802.11—Task Group N—Meeting Update, http://grouper.ieee.org/groups/802/11/Reports/tgn_update.htm, pp. 1-7.

Jon Rosdahl, "Draft PAR for High Throughput Study Group," Nov. 15, 2002, Revision R1: Jan. 16, 2003, IEEE 802.11-02/798r1, pp. 1-9.

Jon Rosdahl, "Draft PAR for High Throughput Study Group," Nov. 15, 2002, Revision R6: Mar. 13, 2003, IEEE 802.11-02/798r6, pp. 1-8.

Jon Rosdahl, "Criteria for Standards Development," (Five Criteria) Nov. 15, 2002, IEEE 802.11-02/799r0, pp. 1-4.

Jon Rosdahl, "Criteria for Standards Development," (Five Criteria) Nov. 15, 2002, Revision 1: Jan. 16, 2003, IEEE 802.11-02/799r1, pp. 1-4.

Jon Rosdahl, "Criteria for Standards Development," (Five Criteria) Nov. 15, 2002, Revision 1: Jan. 16, 2003, IEEE 802.11-02/799r2, pp. 1-5.

Jon Rosdahl, "Criteria for Standards Development," (Five Criteria) Nov. 15, 2002, Revision 4: Mar. 11, 2003, IEEE 802.11-02/799r3, pp. 1-4.

Jon Rosdahl, "Criteria for Standards Development," (Five Criteria) Nov. 15, 2002, Revision 5: Mar. 13, 2003, IEEE 802.11-02/799r5, pp. 1-4.

* cited by examiner

| TX1 ← 1004 | LTS1 + + ← 1006 | LTS2 + − ← 1008 |
|---|---|---|
| TX2 | | |

| TX1 ← 1012 | LTS1 + + + + ← 1014 | LTS2 + − + − ← 1016 | LTS3 + + − − ← 1018 | LTS4 + − − + ← 1020 |
|---|---|---|---|---|
| TX2 | | | | |
| TX3 | | | | |
| TX4 | | | | |

PACKET PROCESSING SYSTEMS AND METHODS

CROSS-REFERENCE TO RELATED APPLICATION

This application is a continuation-in-part of U.S. utility application entitled, "Legacy Compatible Spatial Multiplexing Systems and Methods," having Ser. No. 11/159,812, filed Jun. 22, 2005, which claimed the benefit of U.S. provisional application having Ser. No. 60/581,358, filed Jun. 22, 2004, both of which are entirely incorporated herein by reference.

This application claims priority to U.S. provisional application entitled, "Singular Preamble Structure for 802.11n PHY Unifying Mixed-Mode and Greenfield," having Ser. No. 60/589,594, filed Jul. 21, 2004, which is entirely incorporated herein by reference.

This application is related to U.S. utility patent application entitled "Packet Generation Systems and Methods," filed on Jul. 20, 2005, and accorded Ser. No. 11/185,665, which claimed the benefit of U.S. provisional application having Ser. No. 60/589,158, filed Jul. 20, 2004, both which are entirely incorporated herein by reference.

BACKGROUND OF THE INVENTION

1. Field of the Invention

The present disclosure is generally related to communication systems, and, more particularly, is related to wireless communication systems and methods.

2. Related Art

Wireless communication systems are widely deployed to provide various types of communication such as voice, data, and so on. These systems may be based on code division multiple access (CDMA), time division multiple access (TDMA), orthogonal frequency division multiplex (OFDM), or some other multiplexing techniques. OFDM systems may provide high performance for some channel environments. FIG. 1A is a block diagram that illustrates an exemplary single-in, single-out (SISO) orthogonal frequency division multiplexing (OFDM) communication system 100 (herein, SISO system 100) that is compliant with IEEE 802.11 standards. The SISO system 100 comprises a transmitter device 102 and a receiver device 104. The transmitter device 102 comprises a transmit (TX) processor 106, radio circuitry 108, and antenna 110. The receiver device 104 comprises an antenna 112, radio circuitry 114, and receive (RX) processor 116.

The transmitter device 102 comprises well-known circuitry that divides the high-speed data signals into tens or hundreds of lower speed signals and transmits the signals in parallel over respective frequencies within a radio frequency (RF) signal that comprise subcarrier frequencies ("subcarriers"). The frequency spectra of the subcarriers overlap so that the spacing between them is minimized. The subcarriers are also orthogonal to each other so that they are statistically independent and do not create cross-talk or otherwise interfere with each other. FIG. 1B is a schematic diagram that illustrates an exemplary OFDM symbol 118 corresponding to signals processed in the SISO system 100. In 802.11 standards, each OFDM symbol 118 provided by the transmitter device 102 comprises 52 subcarriers (partially shown for brevity) centered at a defined reference or carrier frequency, with a bandwidth (BW) of approximately 20 mega-Hertz (MHz). The spectrum resulting from processing at the receiver device 104 is typically centered at the same reference or carrier frequency.

In operation, the transmit processor 106 receives data signals (designated as TX data1 at a defined data rate designated as TX Rate1). The transmit processor 106 encodes and interleaves the data and maps the interleaved data into respective subcarrier channels as frequency domain symbols. Further processing by the transmit processor 106 may result in the insertion of training signals, cyclic extensions (e.g., guard intervals), and additional processing such as inverse fast Fourier transformations (IFFT) and wave shaping. The processed subcarriers are provided to the radio circuitry 108, which provides filtering, modulation, amplification, and upconversion functionality, ultimately resulting in the transmission of data from antenna 110.

FIG. 1C is block diagram that describes an exemplary OFDM packet structure 150 used in the transmission of information between the transmitter device 102 and the SISO receiver device 104. Additional information about the packet structure can be found in 802.11 standards. The packet structure 150 is generated in a baseband processing section (e.g., in or in cooperation with an inverse fast Fourier transform (IFFT) operation) of the transmitter device 102, and comprises several sections. Sections A and B are comprised of short training symbols (STS). Section A is used by a communication system to provide signal detection, automatic gain control (AGC), and diversity selection functionality. Section B is used by a communication system to provide coarse frequency offset estimation and timing synchronization. Section C, sometimes referred to as a long training symbol (LTS), is used by a communication system to provide channel estimation and fine frequency offset estimation. Sections A-C are typically referred to as the preamble portion of a packet. Section D is referred to as the signal field or header, and contains data rate and packet length information. Sections E and F are OFDM symbols, such as OFDM symbol 118a. Sections D, E, and F provide rate length, service and data, and data, respectively.

At the receiver device 104, the antenna 112 receives the transmitted data, which is provided to radio circuitry 114 to complement the processing that occurred at radio circuitry 108. The data is then provided to receive (RX) processor 116, which provides clock recovery, cyclic extension removal, transformations (e.g., fast Fourier transformation, FFT), demapping, deinterleaving, and decoding to recover the TX data1 as RX data1. Transmitter and receiver devices that are compliant to IEEE 802.11a/g standards, such as shown in FIG. 1A, are often referred to as legacy radios or legacy devices.

Continual demand for increased data rates has resulted in the advancement of communications system technology, such as the use of multiple antennas in a single device having transmitter and/or receiver functionality. In terrestrial communication systems (e.g., a cellular system, a broadcast system, a multi-channel multi-point distribution system (MMDS), among others), a RF modulated signal from a transmitter device may reach a receiver device via a number of transmission paths. The characteristics of the transmission paths typically vary over time due to a number of factors such as fading and multi-path. To provide diversity against deleterious path effects and improve performance, multiple transmit and receive antennas may be used for data transmission. Spatial multiplexing refers to a technique where a transmission channel is divided into multiple "spatial channels" through which independent streams can be transmitted and received via multiple transmit and receive antennas, respectively.

FIG. 2 is a block diagram that illustrates a multiple-input multiple-output (MIMO) OFDM communication system 200

(herein, MIMO system 200). The MIMO system 200 employs multiple transmit antennas and multiple receive antennas for data transmission. Through spatial multiplexing, a MIMO channel formed by the transmit and receive antennas may be decomposed into independent channels. Each of the independent channels is also referred to as a spatial subchannel of the MIMO channel. The MIMO system 200 comprises a transmitter device 202 and receiver device 204. The transmitter device 202 comprises transmit (TX) processors 206 and 212, radio circuitry 208 and 214, and antennas 210 and 216. The receiver device 204 comprises antennas 218 and 226, radio circuitry 220 and 228, and receive (RX) processors 224 and 230. The transmit processors 206 and 212 and the radio circuitry 208 and 214 comprise similar circuitry to that found in and described for transmit processor 106 (FIG. 1A), with the addition of circuitry for implementing spatial multiplexing. The radio circuitry 220 and 228 and receive processors 224 and 230 also share common circuitry with like components shown in and described for receiver device 104 (FIG. 1A). The receive processors 224 and 230 may comprise signal separating functionality to remove interference caused by multiple transmit signals occupying the same bandwidth at the receive antennas 218 and 226, and thus may be used to increase the data rate.

In developing systems such as MIMO that utilize multiple-antenna devices, there is a need to consider legacy receivers (e.g., single-input, single output (SISO), OFDM receivers) and the design challenges concomitant with implementing transmitters with multiple antennas in an environment that still uses legacy receivers.

SUMMARY

Various packet processing systems and methods are disclosed. One method embodiment, among others, comprises providing a legacy long training symbol (LTS), and inserting subcarriers in the legacy LTS to form an extended LTS (ELTS).

Other systems, methods, features, and advantages of the disclosed systems and methods will be or become apparent to one with skill in the art upon examination of the following drawings and detailed description. It is intended that all such additional systems, methods, features, and advantages be included within this description and be within the scope of the disclosure.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

FIGS. 10A and 10B are schematic diagrams that illustrate orthogonal sequences for 2-ary and 4-ary Walsh (also known as Walsh-Hadamard) coding, respectively.

DETAILED DESCRIPTION

Figure 1A:
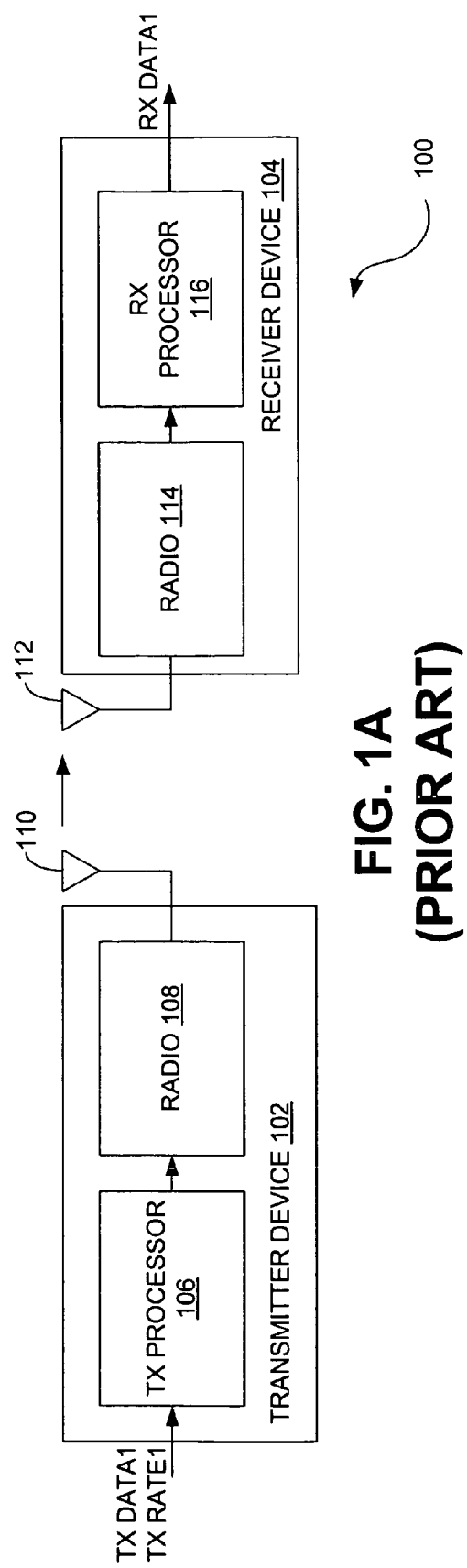
FIG. 1A is a block diagram that illustrates an exemplary single-in, single-out (SISO) orthogonal frequency division multiplexing (OFDM) communication system.
Figure 1B:
FIG. 1B is a schematic diagram that illustrates subcarriers of an OFDM symbol processed in the SISO OFDM communication system shown in FIG. 1A.
Figure 1C:
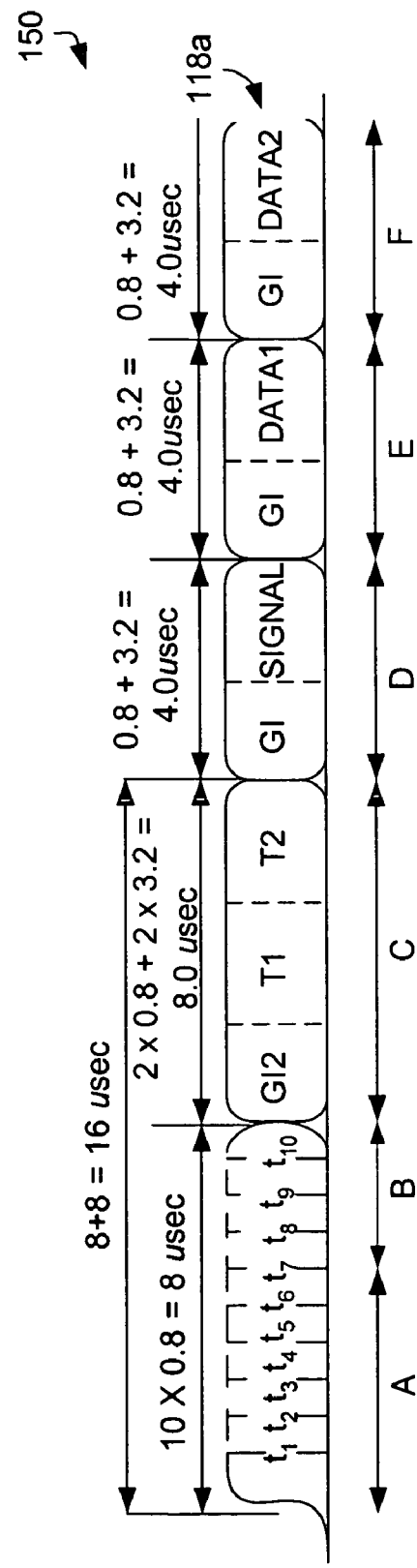
FIG. 1C is a block diagram that illustrates an exemplary OFDM packet structure used in SISO and multiple-input, multiple-output (MIMO) OFDM communication systems.
Figure 2:
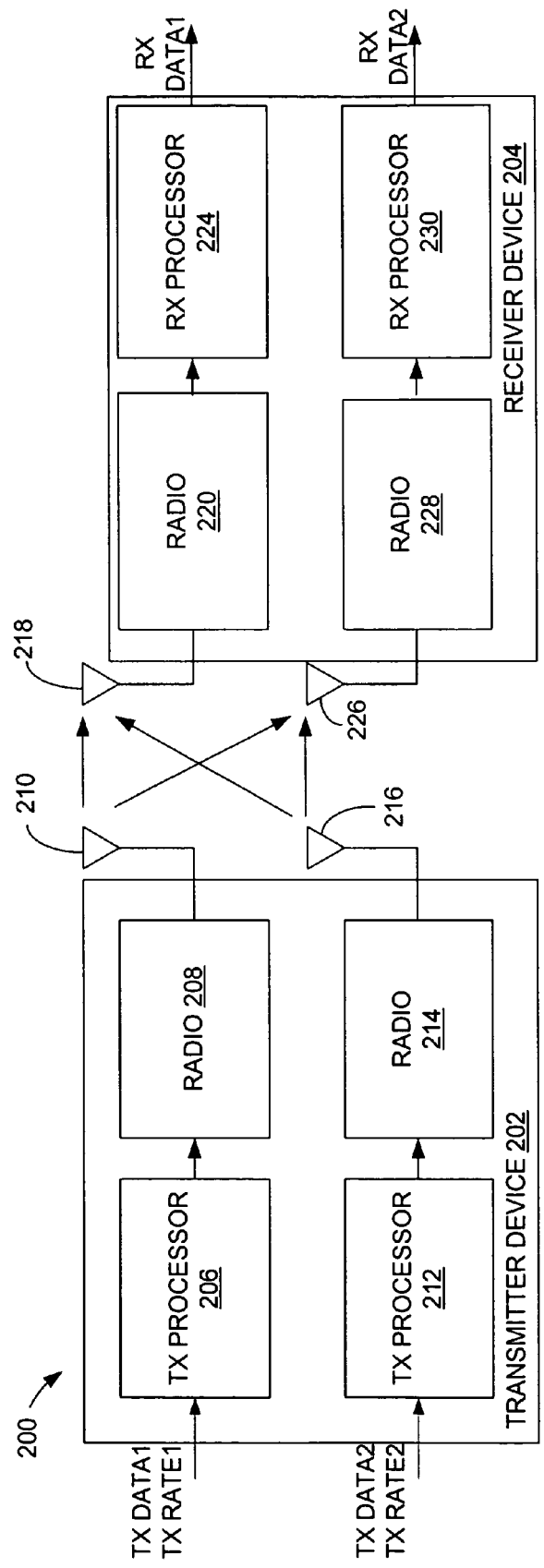
FIG. 2 is a block diagram that illustrates a MIMO OFDM communication system.

Disclosed are various embodiments of legacy compatible, spatial multiplexing (SM) systems and methods (herein, referred to as LCSM systems). Such embodiments are described in the context of multiple-input multiple-output (MIMO), orthogonal frequency division multiplex (OFDM) communication systems. In one embodiment, an LCSM system comprises one or more transmit modules that include waveshape logic configured to generate transmit waveforms (e.g., packet segments) that enable a receiver to implement channel estimate processing corresponding to signals emitted from multiple transmit antennas. The waveshape logic generates, in one embodiment, a two-part packet that is employed in both MIMO spatial multiplexed packet transmission and reception and legacy transmission and reception. That is, a first portion of a packet includes a legacy preamble that is compatible for use with legacy receivers (e.g., 801.11a/g receivers). Legacy receivers recognize the first portion as a normal legacy preamble, and thus process the corresponding packet in a conventional manner. A second portion of the packet includes a cyclic shifted, inverted long training symbol that is used to enable successful processing by a SM MIMO receiver (e.g., 802.11n compatible receiver).

In one implementation, 52 subcarriers are used for the MIMO portion of a preamble and the legacy portion of the preamble at the transmit side. In another implementation, 56 or more subcarriers are used for the MIMO portion of a preamble. Such an implementation in conventional systems would represent a discontinuity in bandwidth between the legacy preamble portion (having 52 subcarriers) and the MIMO portion (having 56 or more subcarriers). Such a discontinuity also results in conventional systems ignoring the legacy portion of the preamble in training or estimating the channel corresponding to the MIMO signal, which wastes packet overhead. Thus, one embodiment of the waveshape logic processes the long training symbol in a manner that adds subcarriers to each end of a symbol to provide an extended long training symbol (ELTS) having 56 or more subcarriers. It is noted that although the width of the long training symbol is extended, the duration preferably remains unchanged.

Certain LCSM system embodiments described herein reuse the cyclic shifted legacy portion of a packet to enable orthogonal channel estimation at either a MIMO receiver in a spatial multiplexing environment or a legacy receiver. With spatial multiplexing techniques, two or more signals can be delivered in the same frequency channel, providing a mechanism for a receiver to exploit multipath signals (e.g., signals emitted from each transmit antenna that bounce off structures to create multiple signals arriving at different angles at a receiver) to mitigate or eliminate interference that the receiver experiences between two or more transmit signals. That is, the cyclic shift, which may be implemented as an advance or delay, mitigates (or eliminates) self-interference of a preamble portion of the transmitted signal, and enables the transmission of legacy preamble portions provided from multiple transmit antennas. By reusing the cyclic shifted preambles, channel estimation is efficient since such channel estimation makes use of the legacy portion of the packet. Reusing the cyclic shifted portion also allows digital circuitry to be reused.

In one embodiment, channel estimation is performed using Walsh coding, which is a well-known waveform algorithm that uses addition and subtraction to separate two signals. Thus, joint channel estimation of signals, provided from multiple transmit antennas, by a receiver is enabled with reuse of the legacy preamble in the channel estimation.

In another embodiment, channel estimation is performed using large cyclic shifts in addition to Walsh coding.

Certain LCSM system embodiments are described in the context of a 2×2 MIMO OFDM system that utilizes Walsh code orthogonalization. However, one of ordinary skill in the art would appreciate that other spatial multiplexing orders (e.g., 3×3, 4×4, etc.) and other channel estimation methods can be used and hence are considered within the scope of the disclosure. For instance, embodiments are described using three and four transmit antennas. Further, although described in the context of IEEE 802.11 compatible systems (e.g., 802.11 a/g, 802.11 n, etc.), it would be understood by one having ordinary skill in the art that the disclosed systems and methods apply to any systems compliant to OFDM-based standards.

Figure 3:
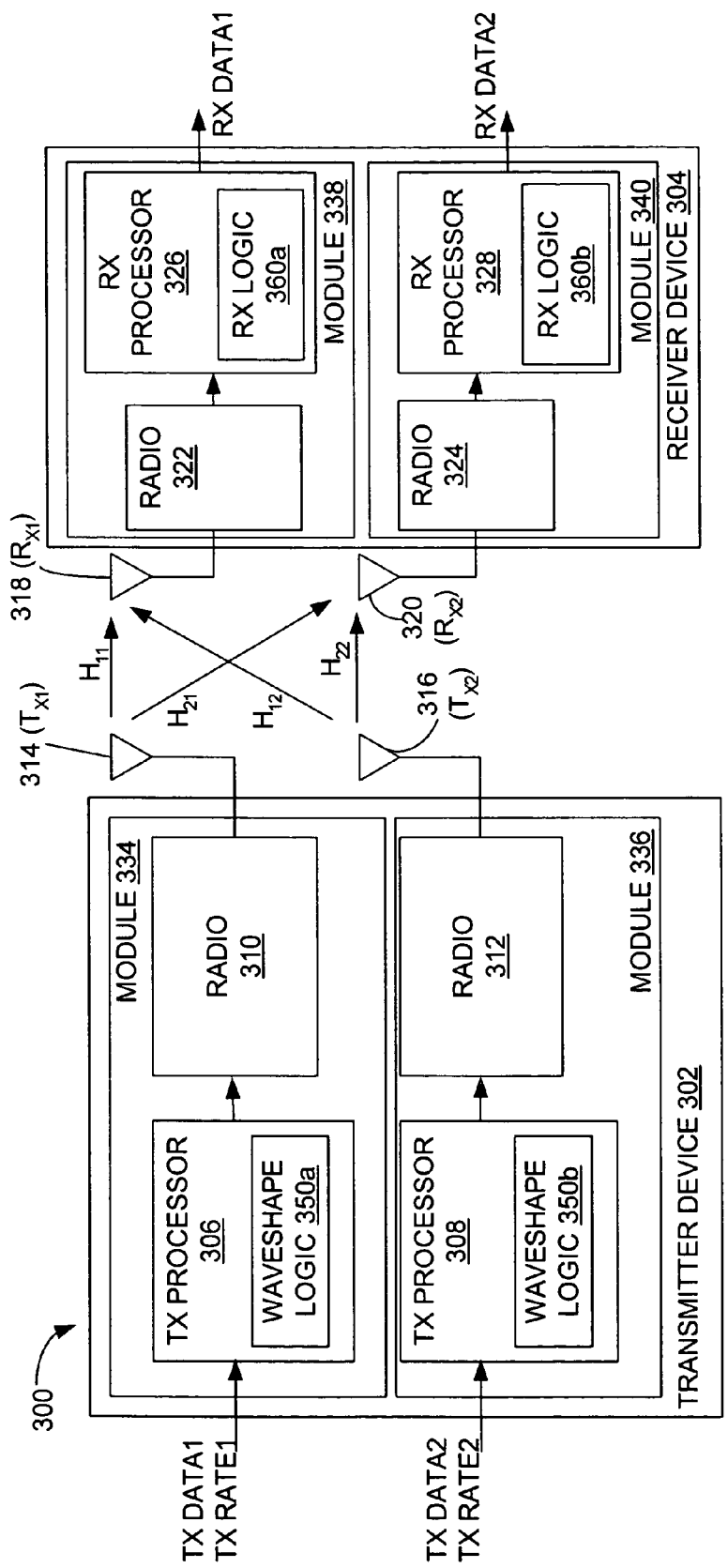
FIG. 3 is a block diagram that illustrates an embodiment of a legacy compatible spatial multiplexing (LCSM) system.

FIG. 3 is a block diagram that illustrates an embodiment of a LCSM system 300. The LCSM system 300, though shown encompassing transmit and receive components, may comprise select components of one or more of the same in some embodiments. In one embodiment, the LCSM system 300 comprises a multiple-input multiple-output (MIMO), orthogonal frequency division multiplexing (OFDM) communication system that generates a packet having a legacy preamble portion and a MIMO spatial multiplexing portion, and reuses the legacy preamble portion to provide orthogonal channel estimation. The LCSM system 300 comprises a transmitter device 302 and a receiver device 304. The transmitter device 302 may include functionality of the receiver device 304, and the receiver device 304 may comprise functionality of the transmitter device 302. Further, the described embodiments may be embodied in many wireless communication devices, including computers (desktop, portable, laptop, etc.), consumer electronic devices (e.g., multi-media players), compatible telecommunication devices, telephone communication systems and devices (e.g., voice over IP phones), personal digital assistants (PDAs), or any other type of network devices, such as printers, fax machines, scanners, hubs, switches, routers, set-top boxes, televisions with communication capability, etc.

The transmitter device 302 comprises two modules 334 and 336. Module 334 comprises a transmit (TX) processor 306, radio circuitry 310, and an antenna 314 (herein, also first transmit antenna, or $T_{X1}$). Module 336 comprises a transmit (TX) processor 308, radio circuitry 312, and antenna 316 (herein, also second transmit antenna, or $T_{X2}$). The modules 334 and 336, or select components of the same, may also be referred to as packet processing systems or transmit side packet processing systems. The transmit processors 306 and 308 comprise waveshape logic 350a and 350b, respectively. The waveshape logic 350a, 350b generate two-part packets and provide for extended LTSs, as described below. Briefly, for data symbols and signal fields, transmit processors 306 and 308 encode and interleave the incoming data (designated TX data1 and TX data2 at TX data rate1 and TX data rate2, respectively). Transmit processors 306 and 308 map the interleaved data into respective subcarrier channels as frequency domain symbols, and include further processing for the insertion of training signals, cyclic extensions (e.g., guard intervals), preamble generation, and inverse fast Fourier transformation (IFFT) and wave shaping. The processed subcarriers are provided to the radio circuitry 310 and 312, which provides filtering, modulation, and amplification functionality.

The receiver device 304 comprises modules 338 and 340. Module 338 comprises an antenna 318 (herein, also first receive antenna, or $R_{X1}$), radio circuitry 322, and receive (RX) processor 326. Receive processor 326 comprises receive (RX) logic 360a, which provides channel estimation functionality and multipath separation as described below. The module 338 may comprise additional circuitry, such as a signal separator, among other components as would be understood by one having ordinary skill in the art. Module 340 comprises an antenna 320 (herein, also second receive antenna, or $R_{X2}$), radio circuitry 324, and receive (RX) processor 328, which comprises receive (RX) logic 360b, which provides channel estimation functionality and multipath separation as described below. The module 340 may comprise additional circuitry, such as a signal separator, among other components as would be understood by one having ordinary skill in the art. The modules 338 and 340, or select components of the same, may also be referred to as packet processing systems or receive side packet processing systems.

At the receiver device 304, the antennas 318 and 320 receive the transmitted data, and provide the same to radio circuitry 322 and 324, which provide downconversion functionality among other functionality to complement the processing that occurred at radio circuitry 310 and 312. The corresponding downconverted signals are provided to receive processors 326 and 328 to separate multipath signals and recover the original data as RX data1 and RX data2. Receive processors 326 and 328 may provide clock recovery, cyclic extension removal, transformation (e.g., fast Fourier transformation, FFT), demapping, deinterleaving, and/or decoding functionality, among other functionality.

One or more components of the LCSM system 300, such as the waveshape logic 350a, 350b and the receive logic 360a, 360b, can be implemented using digital circuitry, analog circuitry, or a combination of both. Also, one br more components of the LCSM system 300 can be implemented in hardware, software, firmware, or a combination thereof. If implemented in hardware, the one or more components of the LCSM system 300 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

If implemented partly or wholly in software, the one or more components of the LCSM system 300 can be comprised of software or firmware that is stored in a memory and that is executed by a suitable instruction execution system.

Figure 4A:
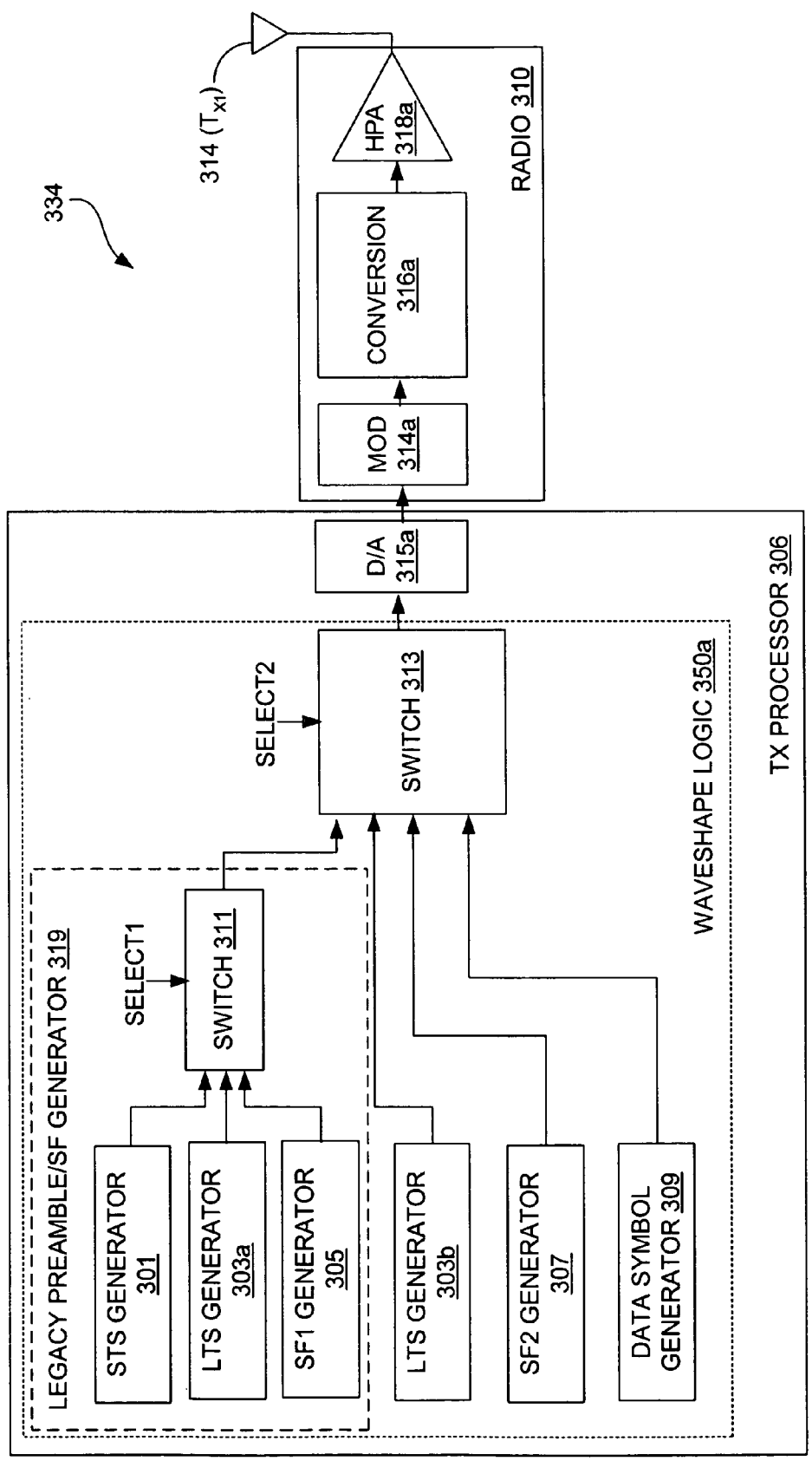
FIG. 4A is a block diagram that illustrates an embodiment of a transmit module of the LCSM system shown in FIG. 3.

FIG. 4A is a block diagram that illustrates an embodiment of the module 334 of FIG. 3. The module 334 comprises the transmit processor 306, radio 310, and first transmit antenna 314. The transmit processor 306 comprises a waveshape logic 350a that generates the packet structure. The waveshape logic comprises a legacy preamble/signal field (SF) generator 319. The legacy preamble/SF generator 319 comprises a short training symbol (STS) generator 301, a long training symbol (LTS) generator 303a, a SF1 generator 305, and a switch 311. The STS generator 301 and LTS generator 303a are configured to generate segments of a legacy preamble. The LTS generator 303a also includes functionality to insert additional subcarriers to a standard, 52-subcarrier legacy LTS symbol. The STS generator 301 generates a STS segment and the LTS generator 303a generates a LTS segment in conformity to 802.11 standards. The SF1 generator 305 generates a signal field segment.

These segments are input to the switch 311, and based on a control signal (Select1), are provided as a coordinated output to switch 313, which also is part of the waveshape logic 350a. The waveshape logic 350a further includes a LTS generator 303b, a SF2 generator 307, and a data symbol generator 309. In one embodiment, the LTS generator 303b is the same component as the LTS generator 303a, just designated with different letters ("a" and "b") to distinguish their respective role in supplying a LTS segment for a legacy preamble portion (LTS generator 303a) and a spatial multiplexing portion (LTS generator 303b). The SF2 generator 307 receives data rate information, among other information pertaining to spatial multiplexing environments, and the data symbol generator 309 receives data bits. The switch 313 receives the respective segments from generators 303b, 307, and 309, and also receives the segments from switch 311, and based on the control input (Select2), provides the segments in coordinated fashion to the digital-to-analog (D/A) converter 315a of the transmit processor 306.

It would be understood by one having ordinary skill in the art that transmit processor 306 may comprise additional circuitry, such as a forward error correction (FEC) encoder and an interleaver/mapper to be used in conjunction with data symbol and signal field processing as is known, as well as symbol shape logic, among other components. For instance, an FEC encoder (or FEC coder) may receive information from a data source and encode the received information according to one or more encoding schemes. The FEC encoder may provide the encoded information to an interleaver/mapper, which interleaves or distributes the encoded information and maps (e.g., over approximately 64-subcarriers) the same for use over the first transmit antenna 314. Symbol shape logic provides interpolator functionality as well as low-pass filter smoothing of edges between successive OFDM symbols, in one embodiment creating tapered trailer and leading edges of each OFDM symbol.

The radio 310 receives the analog signal corresponding to the packet structure generated in the waveshape logic 350a. The radio 310 comprises a modulator 314a (e.g., in-phase/quadrature (I/Q) modulator and oscillator), conversion logic 316a (e.g., oscillator and mixer), and high power amplifier (HPA) 318a. It would be appreciated by one having ordinary skill in the art that fewer, additional, and/or different components can be included in the module 334. Within the radio 310, the analog transmission signals are modulated, upconverted, and amplified/filtered at modulator 314a, conversion logic 316a, and HPA 318a, respectively. The resulting signal is then transmitted over first transmit antenna 314.

Figure 4B:
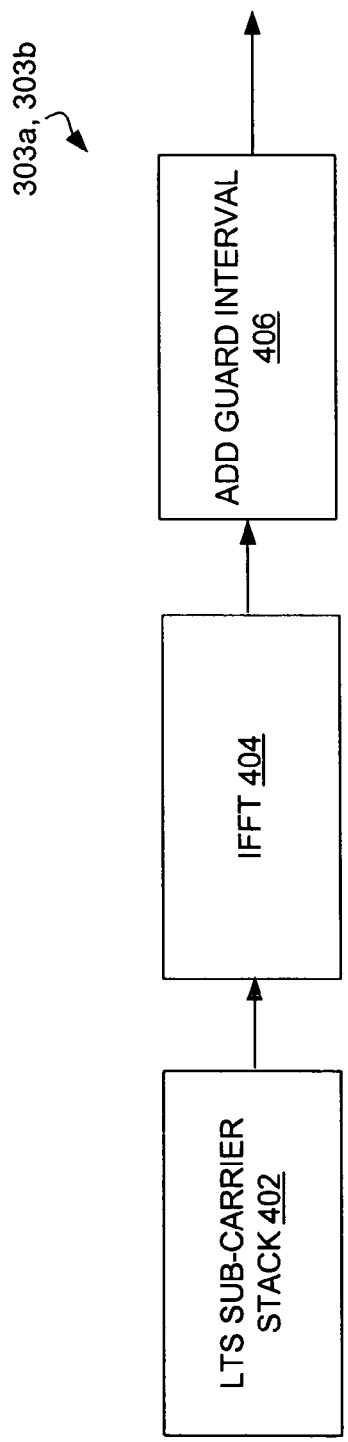
FIG. 4B is a block diagram that illustrates an embodiment of a long training symbol (LTS) generator of the transmit module shown in FIG. 4A.

FIG. 4B illustrates an embodiment of LTS generator 303a, 303b, and comprises a long training symbol (LTS) subcarrier stack 402, inverse fast Fourier transform (IFFT) circuitry 404 (e.g., 64-point IFFT), and an add guard interval module 406. Concerning the insertion of extra subcarriers, extra active subcarriers may be placed in the subcarrier stack 402. That is, for legacy 802.11a/g implementations, there are 52 active subcarriers placed in the stack and input to the IFFT circuitry 404. For extended LTS implementations, such as for 20 MHz applications, 56 active subcarriers are placed in the subcarrier stack 402. Inactive subcarriers are zeroed in the stack of 64 for the 64-point IFFT circuitry 404. Thus, LTS subcarriers from the LTS subcarrier stack 402 are provided to the IFFT circuitry 404 for formation into an OFDM symbol. The IFFT circuitry 404 converts the subcarriers to its corresponding time-domain representation (an OFDM symbol), and removes various subcarriers.

Figure 4C:
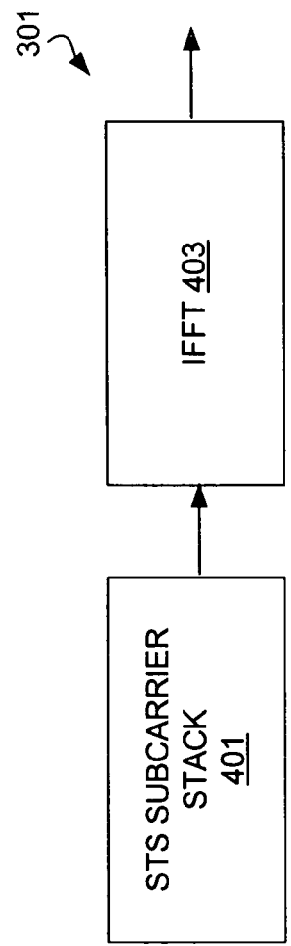
FIG. 4C is a block diagram that illustrates an embodiment of a short training symbol (STS) generator of the transmit module shown in FIG. 4A.

FIG. 4C is a block diagram that illustrates an embodiment of the STS generator 301. Like the LTS generator 303a, 303b, the STS generator 301 generates a deterministic signal waveform that is used at a receiver to estimate channel information. The STS generator 301 comprises a STS subcarrier stack 401 that feeds an IFFT 403. The components of the STS generator comprise similar functionality for generating STS segments as like components described above for the LTS segments, and thus discussion of the same is omitted for brevity.

Figure 4D:
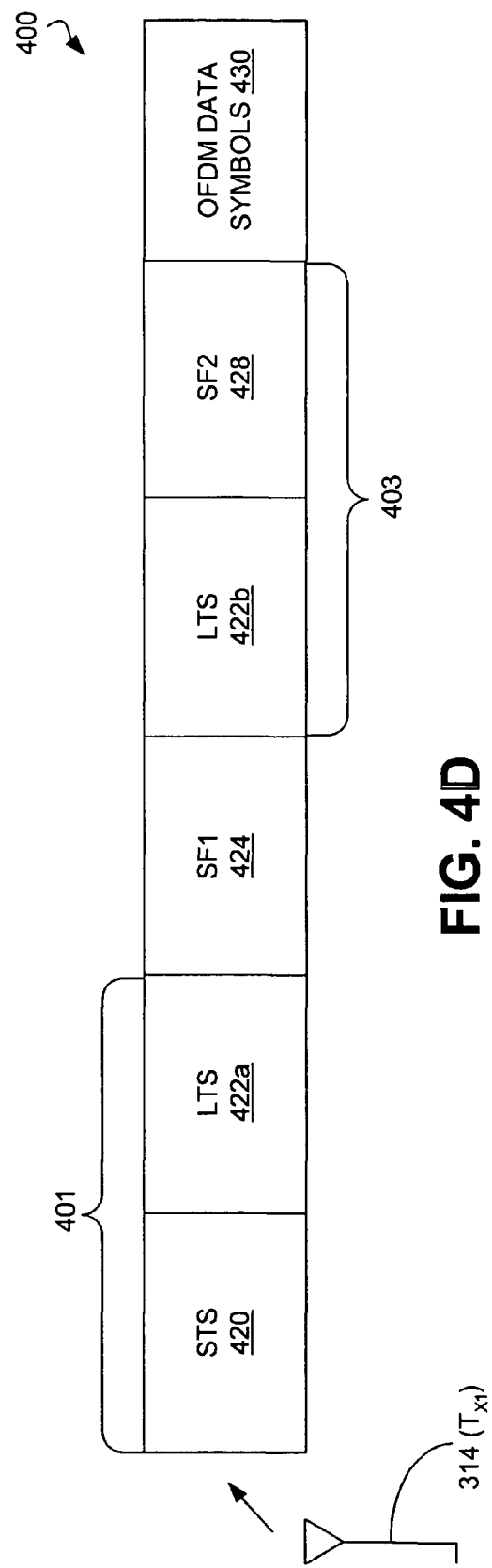
FIG. 4D is a block diagram that illustrates an exemplary packet structure generated by the waveshape logic and transmitted from a first antenna shown in FIG. 4A.

FIG. 4D is a block diagram that illustrates an exemplary packet structure generated 400 generated by the waveshape logic 350a and transmitted from the first transmit antenna 314 ($T_{X1}$). Further, the description of the various segments described in association with FIG. 4D may also be applied to like segments for packet segments described below with or without cyclic shifting implemented for the respective segment. The packet structure 400 comprises a legacy preamble portion 401 and a MIMO, spatial multiplexing (SM) portion 403. The legacy preamble portion 401 comprises a short training symbol (STS) segment 420 and a long training symbol (LTS) segment 422a. Also included in the packet structure 400 is a signal field (SF1) segment 424. The MIMO, SM portion 403 comprises the reused LTS (designated as 422b to distinguish between portions) segment 422b and a signal field (SF2) segment 428. The STS segment 420 is used by the LCSM system 300 to provide signal detection, automatic gain control (AGC), and diversity selection functionality, as well as to provide coarse frequency offset estimation and timing synchronization. The LTS segments 422a, 422b are used by the LCSM system 300 to provide channel estimation and fine frequency offset estimation. The LTS segments 422a, 422b are fixed, deterministic waveforms (e.g., deterministic subcarriers) that are used to perform channel estimation. The SF1 segment 424 conveys the length of a packet 400 in time, which is used by a receiver to assist the receiver in determining when a packet is complete and ready for analysis (e.g., error detection, correction, etc.). The SF1 segment 424 also conveys a data rate of the packet 400.

The MIMO SM portion 403 is a new portion of the packet 400 according to one embodiment. With conventional single-input, single output (SISO) receivers, each receive antenna only needed to estimate the channel corresponding to a single transmit antenna. However, with two transmit antennas as found in the LCSM system 300, at least two channels are estimated at each receive antenna. In other words, the LTS segment 422a is used again in portion 403 (designated 422b) to enable the receive module 338 to estimate the channels corresponding to both transmit antennas 314 and 316, as described below. With regard to the signal field (SF2) segment 428, information conveyed includes data rates corresponding to MIMO SM systems (e.g., 108 MBs for 802.11n systems), the SM order (e.g., $2^{nd}$ order for 2×2, $3^{rd}$ order, $4^{th}$ order, etc.), information about error detection and type (e.g., Viterbi, turbo), etc. MIMO SM receivers acquire and process, substantially in parallel, the legacy portion 401 and MIMO SM portion 403 to enable processing according to the capabilities to which the receiver is configured.

Note that, as is true with packet portions described below, different configurations may be used. For instance, the SF2 segment 428 may immediately follow SF1 segment 424 in some embodiments. Further, the duration of the various segments described above and below may be configured differently. For instance, one embodiment for the SF2 segment 428 may require 4 microseconds duration. Some embodiments may require more duration, depending on the information that is to be conveyed, among other design considerations.

Figure 5A:
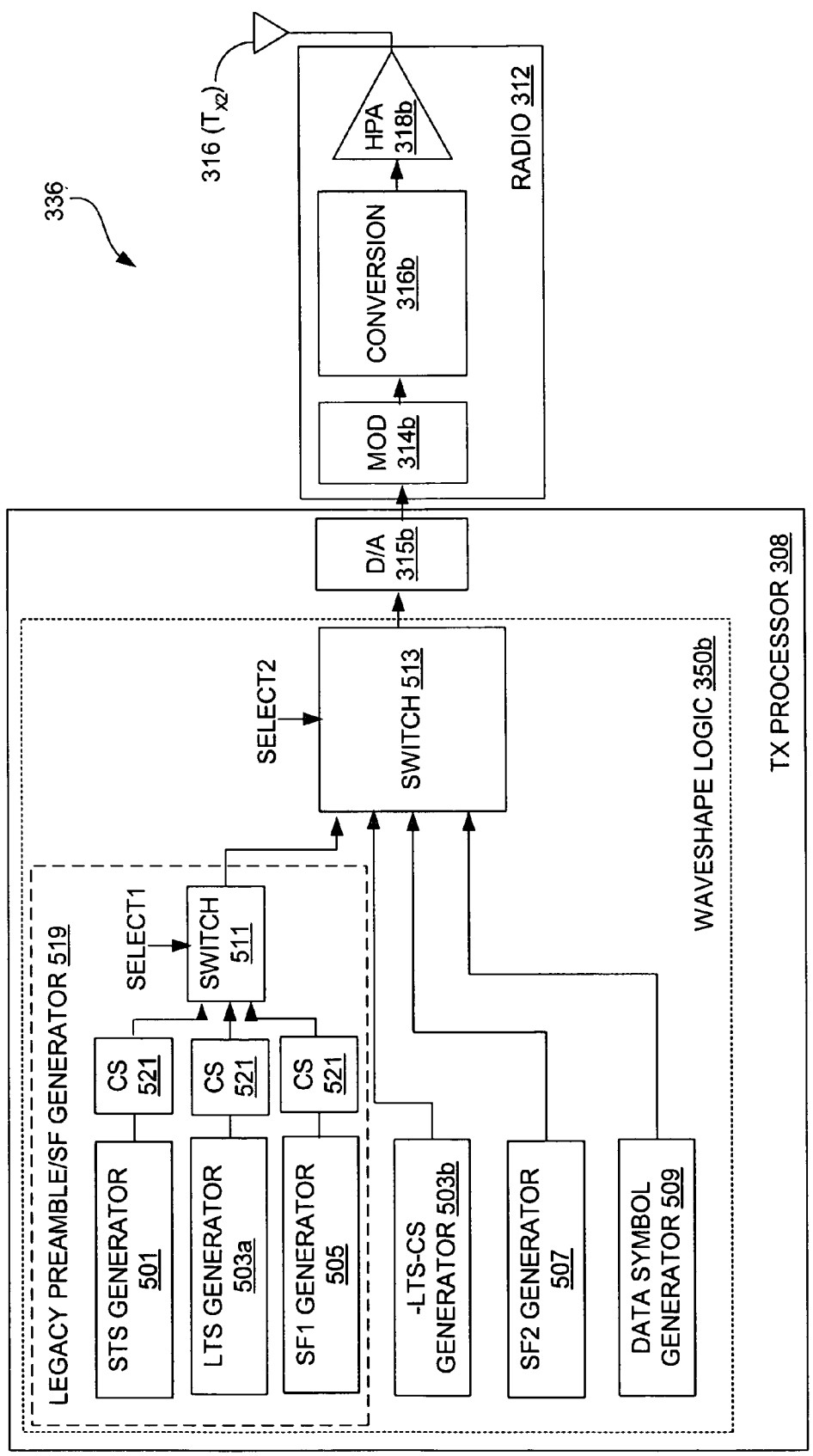
FIG. 5A is a block diagram that illustrates an embodiment of a cyclic shift transmit module of the LCSM system shown in FIG. 3.

FIG. 5A is a block diagram that illustrates an embodiment of module 336, which is configured to provide cyclic shifting of one or more segments of a packet structure. The module 336 comprises the transmit (TX) processor 308, the radio 312, and the second transmit antenna 316. The transmit processor 308 comprises a waveshape logic 350b for generating the cyclically shifted packet structure. The waveshape logic 350b comprises a legacy preamble/signal field (SF) generator 519. The legacy preamble/SF generator 519 comprises a short training symbol (STS) generator 501, a long training symbol (LTS) generator 503a, a SF1 generator 505, cyclic shift modules 521, and a switch 511. Note that in some embodiments, the cyclic shift functionality may be included in the respective generator. The STS generator 501 and LTS generator 503a are configured to generate segments of a legacy preamble. The STS generator 501 generates a STS segment and the LTS generator 503a generates a LTS segment in conformity to 802.11 standards. The LTS generator 503a also includes functionality to insert additional subcarriers to a standard, 52-subcarrier legacy LTS symbol. The SF1 generator 505 generates a signal field segment. These segments are input to the cyclic shift modules 521 to undergo a cyclic shift (e.g., advance or delay), and then the cyclically shifted segments are provided to switch 511, and based on a control signal (Select1), are provided as a coordinated output to switch 513, which also is part of the waveshape logic 350b.

The waveshape logic 350b further includes an inverted (represented with a minus sign), cyclically shifted LTS generator 503b (−LTS-CS), a SF2 generator 507, and a data symbol generator 509. In one embodiment, the inverted, cyclically shifted LTS generator 503b is the same component as the LTS generator 303a, with the addition of an inverter that can be disabled or made transparent for legacy portion LTS generation functionality. The SF2 generator 507 receives data rate information, among other information pertaining to spatial multiplexing environments, and the data symbol generator 509 receives data bits. The switch 513 receives the respective segments from generators 503b, 507, and 509, and also receives the segments from switch 511, and based on the control input (Select2), provides the segments in coordinated fashion to the digital-to-analog (D/A) converter 315b of the transmit processor 308.

It would be understood by one having ordinary skill in the art that transmit processor 306 may comprise additional circuitry, as described in association with FIG. 4A.

The radio 312 receives the analog signal corresponding to the packet structure generated in the waveshape logic 350b. The radio 312 comprises a modulator 314b (e.g., in-phase/quadrature (I/Q) modulator and oscillator), conversion logic 316b (e.g., oscillator and mixer), and high power amplifier (HPA) 318b. It would be appreciated by one having ordinary skill in the art that fewer, additional, and/or different components can be included in the module 336. Within the radio 312, the analog transmission signals are modulated, upconverted, and amplified/filtered at modulator 314b, conversion logic 316b, and HPA 318b, respectively. The resulting signal is then transmitted over second transmit antenna 316 ($T_{x2}$). It is noted that the quantity and spectral alignment of the extended subcarriers on the second transmit antenna 316 preferably match the extension on the first transmit antenna 314.

Figure 5B:
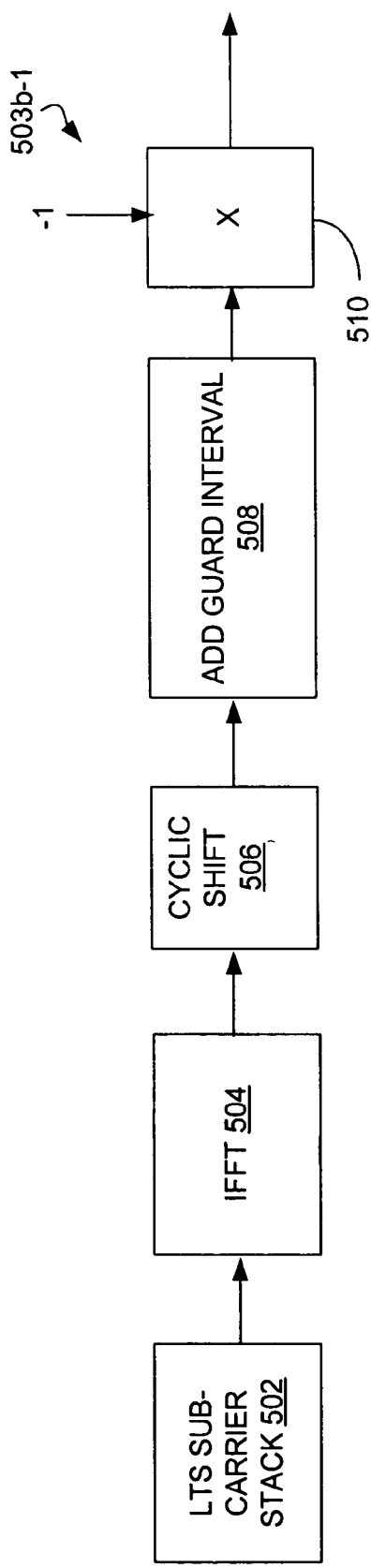
FIGS. 5B-5C are block diagrams that illustrate two embodiments of an inverted LTS-CS (cyclic shifted) generator shown in FIG. 5A.
Figure 5C:
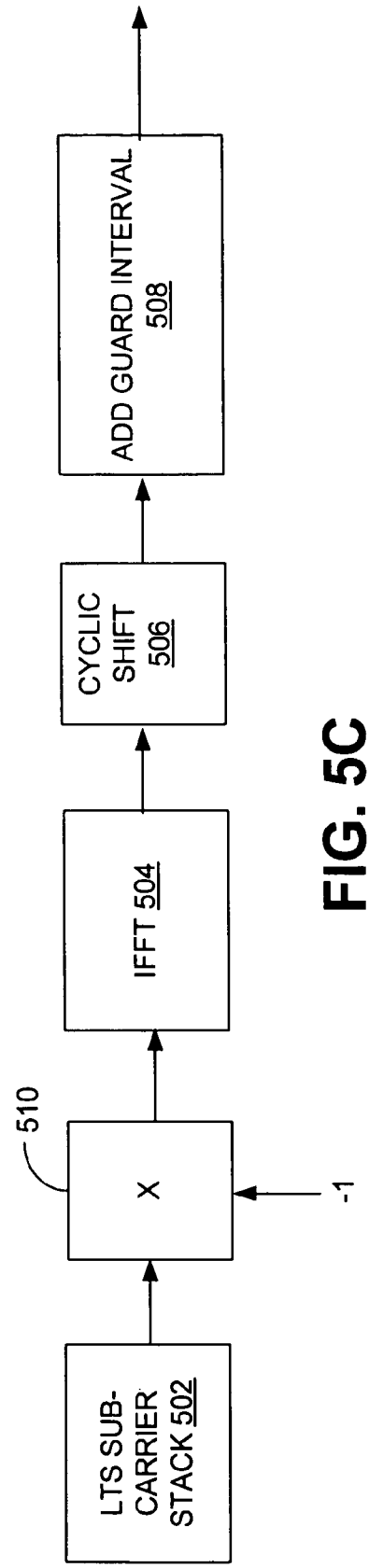

FIGS. 5B-5C are block diagrams that illustrate two embodiments (503b-1 and 503b-2, respectively) of an inverted, cyclically shifted LTS generator 503b that provides cyclic shifting of the MIMO SM portion of a packet to be transmitted over the second transmit antenna 316 ($T_{x2}$). Inverted, cyclically shifted LTS generator embodiments 503b-1 and 503b-2 comprise a LTS carrier subcarrier stack 502, IFFT 504, and add guard interval 508, similar to the LTS generator 303a, 303b described in association with FIG. 4B. The inverted, cyclically shifted LTS generator 503b-1 further includes a cyclic shift module 506 to provide cyclic delay or advances to the LTS segment, and an inverter logic (X) 510. With reference to FIG. 5B, a time domain embodiment corresponding to LTS processing is shown. That is, in the inverted, cyclically shifted LTS generator 503b-1, an LTS waveform from LTS subcarrier stack 502 undergoes processing at the IFFT circuitry 504 to provide a time-domain waveform. Similar processing with regard to subcarrier insertion is as described in association with FIG. 4B. The resultant samples are cyclically shifted at the cyclic shift module 506, a guard interval added at add guard interval 508, and inverted at the inverter logic 510 located after the add guard interval 508. The inverter logic 510 multiples a minus (−) 1 with samples of the cyclically shifted LTS, thus inverting (e.g., make negative) the cyclic shifted LTS in the time domain.

FIG. 5C shows an embodiment of the cyclically shifted LTS generator 503b-2 that performs inversion in the frequency domain. The cyclically shifted LTS generator 503b-1 comprises components 502, 504, 506, and 508 similarly structured, yet connected slightly differently compared to the embodiment 503b-1 shown in FIG. 5B. That is, the inverter module 510 is disposed between the LTS subcarrier stack 502 and the IFFT circuitry 504. Each subcarrier corresponding to a cyclically shifted LTS is made negative, and then applied to the IFFT circuitry 504, resulting in a negative cyclically shifted LTS.

Figure 5D:
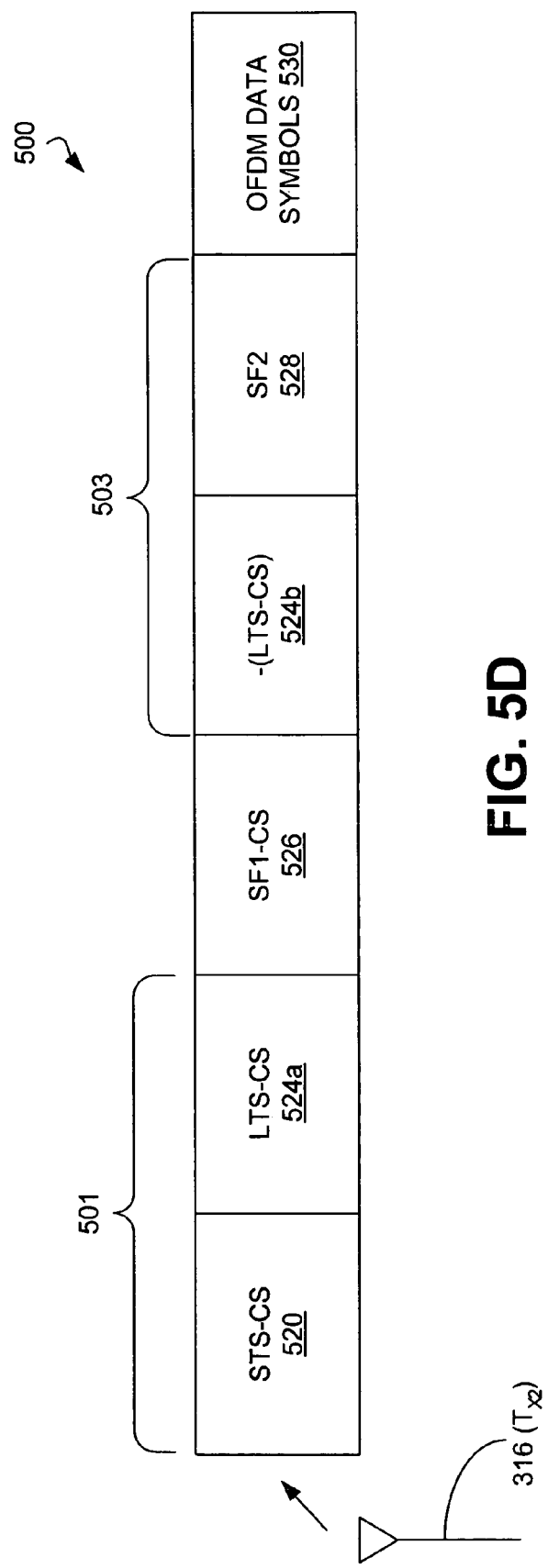
FIG. 5D is a block diagram that illustrates an exemplary packet structure generated by the waveshape logic and transmitted from a second antenna shown in FIG. 5A.

FIG. 5D is a block diagram that illustrates an exemplary packet structure 500 generated by the waveshape logic 350*b* and transmitted from a second transmit antenna 316 ($T_{X2}$). The packet structure 500 comprises a legacy preamble portion 501 and a MIMO-SM portion 503. Segments 520, 524*a*, 526, 528, and 530 are similar in function and structure to segments of the same name described in association with FIG. 4D, except a cyclic shift may be applied, and thus discussion of the same is omitted for brevity. The MIMO SM portion 503 comprises a cyclically shifted, inverted LTS segment 524*b*. The signal field (SF2) segment 528 is not cyclically shifted in one embodiment, although some embodiments may cyclically shift the SF2 segment 528, as well as the data symbols 530.

Note that in one embodiment, the signal field (SF2) segment 528 and the data symbols 530 for the packet 500 may have the cyclic shift removed (or omitted during the processing). In some embodiments, the SF2 segment 528 and/or data symbols 530 may be cyclically shifted.

Before proceeding with a discussion of the receive processing of the LCSM system 300, reference is made again to FIG. 3. As shown, the LCSM system comprises multiple transmit antennas 314 ($T_{X1}$) and 316 ($T_{X2}$) and multiple receive antennas 318 ($R_{X1}$) and 320 ($R_{X2}$) in a spatial multiplexing environment. That is, multipath exists at first receive antenna 318, corresponding to signals provided from first transmit antenna 314 to first receive antenna 318 and from second transmit antenna 316 to first receive antenna 318. Similarly, multipath exists at second receive antenna 320, corresponding to signals provided from first transmit antenna 314 to second receive antenna 320 and from second transmit antenna 316 to second receive antenna 320. Each receive antenna 318 and 320 estimates two multipath channels, one from each of the two transmit antennas 314 and 316. For example, since there are two receive antennas 318 and 320, four channels ($H_{11}$, $H_{12}$, $H_{21}$, $H_{22}$) can be estimated, as shown by Equation (1):

$$\begin{bmatrix} Rx_1 \\ Rx_2 \end{bmatrix} = \begin{bmatrix} H_{11} & H_{12} \\ H_{21} & H_{22} \end{bmatrix} \begin{bmatrix} Tx_1 \\ Tx_2 \end{bmatrix} \quad \text{Eq. (1)}$$

Equation (1) is computed on a subcarrier by subcarrier basis in OFDM environments. For instance, at the first receive antenna 318, a subcarrier at a defined amplitude and phase emitted from first transmit antenna 314 and a subcarrier of a defined amplitude and phase from second transmit antenna 316 is received and interference may result. The equation (1) is performed for each subcarrier received to determine the amplitude and phase.

Figure 6:
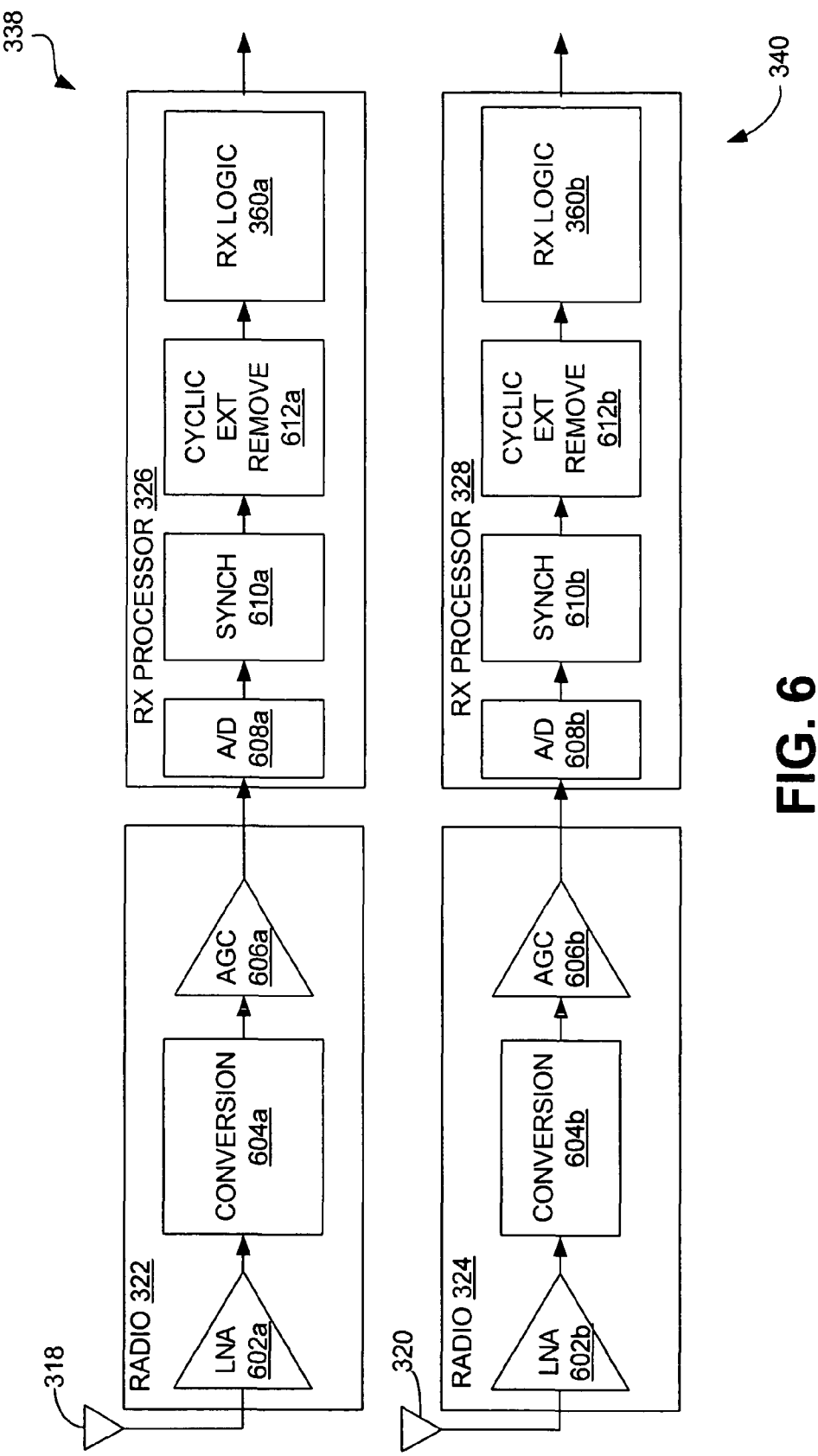
FIG. 6 is a block diagram that illustrates receive module embodiments of the LCSM system shown in FIG. 3.

FIG. 6 is a block diagram that illustrates receive module embodiments 338 and 340. The module 338 comprises a first receive antenna 318, radio 322, and receive (RX) processor 326. The radio 322 comprises a low noise amplifier (LNA) 602*a*, conversion logic 604*a* (e.g., mixer and oscillator), and automatic gain control (AGC) logic 606*a*. The receive (RX) processor 326 comprises analog-to-digital (A/D) converter 608*a*, synchronization logic 610*a*, cyclic extension removal logic 612*a*, and receive (RX) logic 360*a*. Additional processing blocks may be included in module 338 in some embodiments, such as a matched filter combiner(s), memory, state logic, signal separator, among other components. Module 340 comprises similar or the same components as module 338, with similar or the same connections, including a second receive antenna 320, radio 324 (comprising LNA 602*b*, conversion logic 604*b*, and AGC 606*b*), and receive (RX) processing 328 (comprising A/D 608*b*, synchronization logic 610*b*, cyclic extension remove logic 612*b*, and RX logic 360*b*). The discussion of module 340 is omitted for brevity, and discussion below will focus on module 338 with the understanding that the same or similar processing applies to module 340.

Referring to module 338, the signals transmitted from first and second transmit antennas 314 and 316, respectively, are received at first receive antenna 318 and provided to the low noise amplifier (LNA) 602*a*. The LNA 602*a* filters the signal and provides the filtered signal to conversion logic 604*a*, where the filtered signal is downconverted to baseband (e.g., in-phase (I) and quadrature (Q) signals), or intermediate frequency (IF) in some embodiments. The downconverted signal is provided to AGC 606*a*, where the signal is amplified. In some embodiments, the AGC 606*a* may provide the receiver power level back to the transmitter device 302, such as to assist the transmitter device 302 in determining effective transmission methods. The amplified I and Q signals are converted to the digital domain at A/D converter 608*a* of the receive processor 326. The A/D converter 608*a* provides the digital data to the synchronization logic 610*a*. The synchronization logic 610*a* recovers the clock signal and corrects for differences between the oscillation frequency of the local oscillator of the transmitter device 302 and the oscillation frequency of the local oscillator of the receiver device 304. The digital data is further provided to the cyclic extension removal logic 612*a*, which removes un-needed cyclic extensions, and then to the receive logic 360*a*.

Assume that the receive antenna 318 receives packet 400 and 500 transmitted from first transmit antenna 314 and second transmit antenna 316, respectively, LTS1 corresponding to the legacy LTS 422*a* (from first transmit antenna 314) and cyclic shifted legacy LTS-CS 524*a* (from second transmit antenna 316), LTS2 corresponds to the MIMO SM LTS 422*b* (from first transmit antenna 314) and cyclic shifted MIMO SM LTS-CS 524*b* (from second transmit antenna 316). RLTS1 and RLTS2 correspond to the first receive antenna 318 receipt of the LTS1 and LTS2, respectively. That is, during reception of RLTS1, the first receive antenna 318 experiences interference corresponding to LTS1 from first transmit antenna 314 weighted by the multipath channel $H_1$ (i.e, $H_{11}$) interfering with the signal delivered from second transmit antenna 316 weighted by its multipath channel $H_2$ (i.e., $H_{12}$). Likewise, during reception of RLTS2, two signals weighted by their respective channels ($H_1$ and $H_2$) arrive simultaneously, or substantially simultaneously, to cause interference. Processing in the receive logic 360*a* is performed to separate the two signals (corresponding to each transmit antenna 314 and 316), resulting in the following equations (2) and (3):

$$RLTS1 = H1*LTS + H2*LTS\text{-}CS, \quad \text{Eq.(2)}$$

$$RLTS2 = H1*LTS - H2*LTS\text{-}CS, \quad \text{Eq.(3)}$$

A Walsh transform is performed on RLTS1 and RLTS2 in either the time domain or the frequency domain. To obtain information corresponding to the first transmit antenna 314, RLTS1 is added to RLTS2 as shown in Equation (4):

$$RLTS1 + RLTS2 = 2*H1*LTS \quad \text{Eq.(4)}$$

The result of this operation is information corresponding to the first transmit antenna 314 (the information corresponding to the second transmit antenna 316 dropped out because of the minus sign before H$_2$). That is, the second transmit antenna 316 transmitted a negative, cyclic shifted copy of itself during the MIMO SM timeslot (i.e., −(LTS-CS) 524b).

To obtain the information corresponding to second transmit antenna 316, the following computation is performed:

$$RLTS1-RLTS2=2*H2*LTS\text{-}CS \qquad \text{Eq.(5)}$$

The result of this operation is that constructive addition of the information corresponding to the second transmit antenna 316 is achieved (mathematically, a negative of a negative equals a positive), dropping out the information corresponding to the first transmit antenna 314. Thus, separation of signals from the transmit antennas 314 and 316 is accomplished through the Walsh coding. Computation of the amplitude and phase of the separated signals (channel estimation) is performed on the separated signals. For instance, by dividing both sides of equation (4) by 2LTS (i.e., 2 * LTS), the following equation (6) is derived for H$_1$:

$$H_1 = (RLTS1+RLTS2)/(2LTS) \qquad \text{Eq.(6)}$$

To arrive at the channel estimation for H$_2$, equation (5) is divided on both sides by 2LTS-CS, resulting in Equation (7):

$$H_2 = (RLTS1-RLTS2)/(2LTS\text{-}CS) \qquad \text{Eq.(7)}$$

Thus, channel estimates for H1 and H2 have been computed.

Figure 7A:
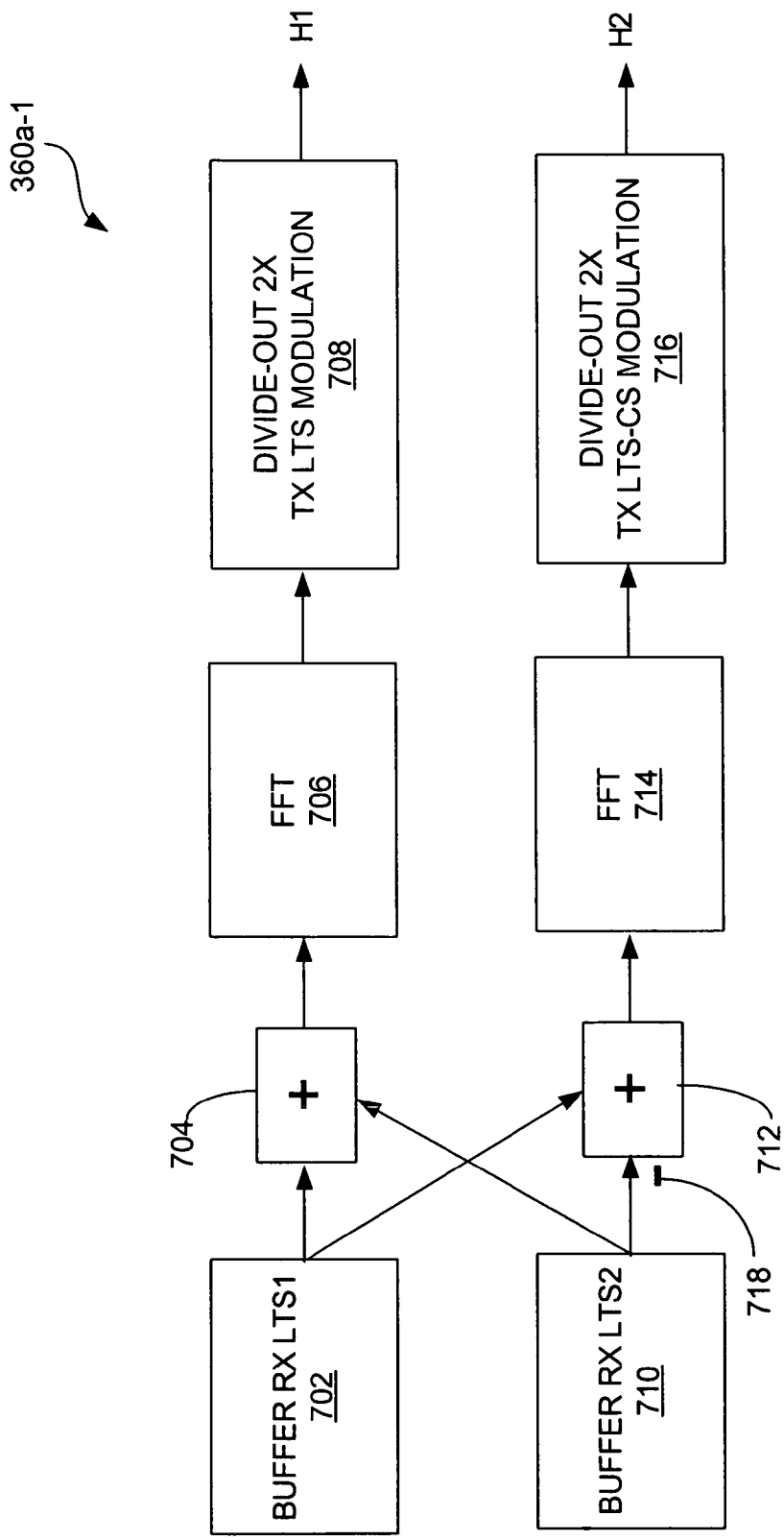
FIGS. 7A-7B are block diagrams that illustrate embodiments of receive logic of one of the receive modules shown in FIG. 6 corresponding to channel estimation.
Figure 7B:
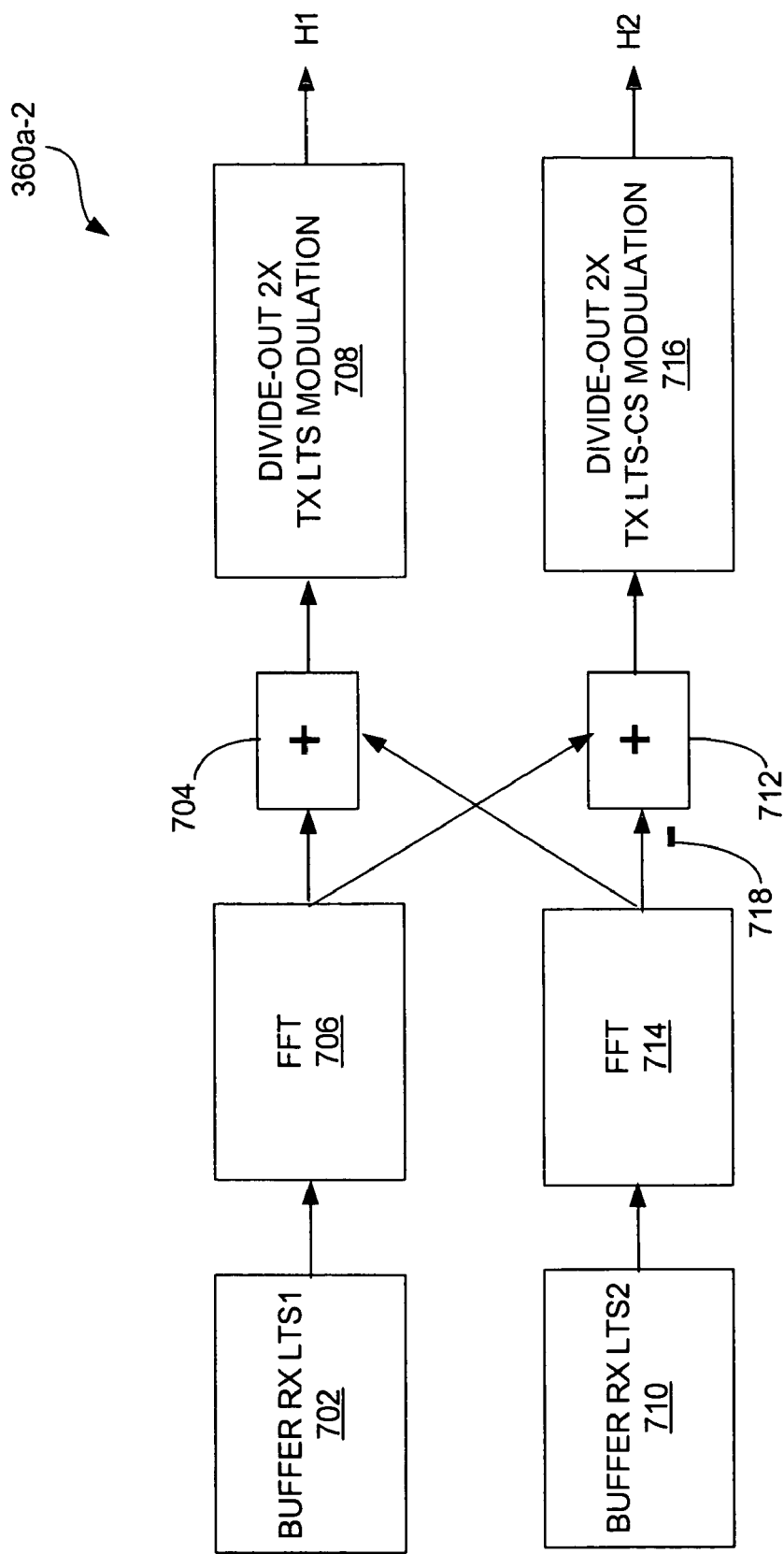

FIGS. 7A-7B are block diagrams that illustrate an embodiment of receive logic 360a-1 and 360a-2, respectively, that performs the computations described above corresponding to equations (2)-(7). FIG. 7A corresponds to Walsh processing in the time domain, and FIG. 7B corresponds to Walsh processing in the frequency domain. Referring to FIG. 7A, the receive logic 360a-1 comprises buffer receive (RX) LTS1 (or RLTS1 buffer) 702 and buffer receive (RX) LTS2 (or RLTS2 buffer) 710 (herein, buffers 702 and 710), adders 704 and 712, FFT modules 706 and 714, and divide-out 2X TX LTS modulation module 708 (herein module 708) and divide-out 2X TX LTS-CS modulation module 716 (herein module 716). The RLTS values are stored in buffers 702 and 710, provided to adders 704 and 712 (subtracted at adder 712, as shown by minus sign 718). The resultant values are transformed at FFT modules 706 and 714 to reproduce the frequency subcarriers, and the transformed values are divided out at modules 708 and 716 to arrive at the channel estimates H$_1$ and H$_2$.

Referring to FIG. 7B, an embodiment of receive logic 360a-2 is shown that performs Walsh coding in the frequency domain. As shown, components 702, 706, 704, 708, 710, 714, 712, and 716 are the same, but rearranged in sequence of operations such that Walsh coding occurs at adders 704 and 712 (where subtraction is represented with minus sign 718) after the FFT modules 706 and 714 transform the values to the frequency domain.

In another embodiment, a cyclic shifted channel estimate may be computed in association with the second transmit antenna 316. That is, equations (2)-(6) remain as described above, but equation (7) is replaced with equation (8), which is as follows:

$$H_2\text{-}CS = (RLTS1-RLTS2)/(2LTS) \qquad \text{Eq.(8)}$$

That is, equation (5) is divided by a non-cyclic shifted LTS, and the result is a cyclic shifted version of H$_2$ (i.e., H$_2$-CS).

Figure 8A:
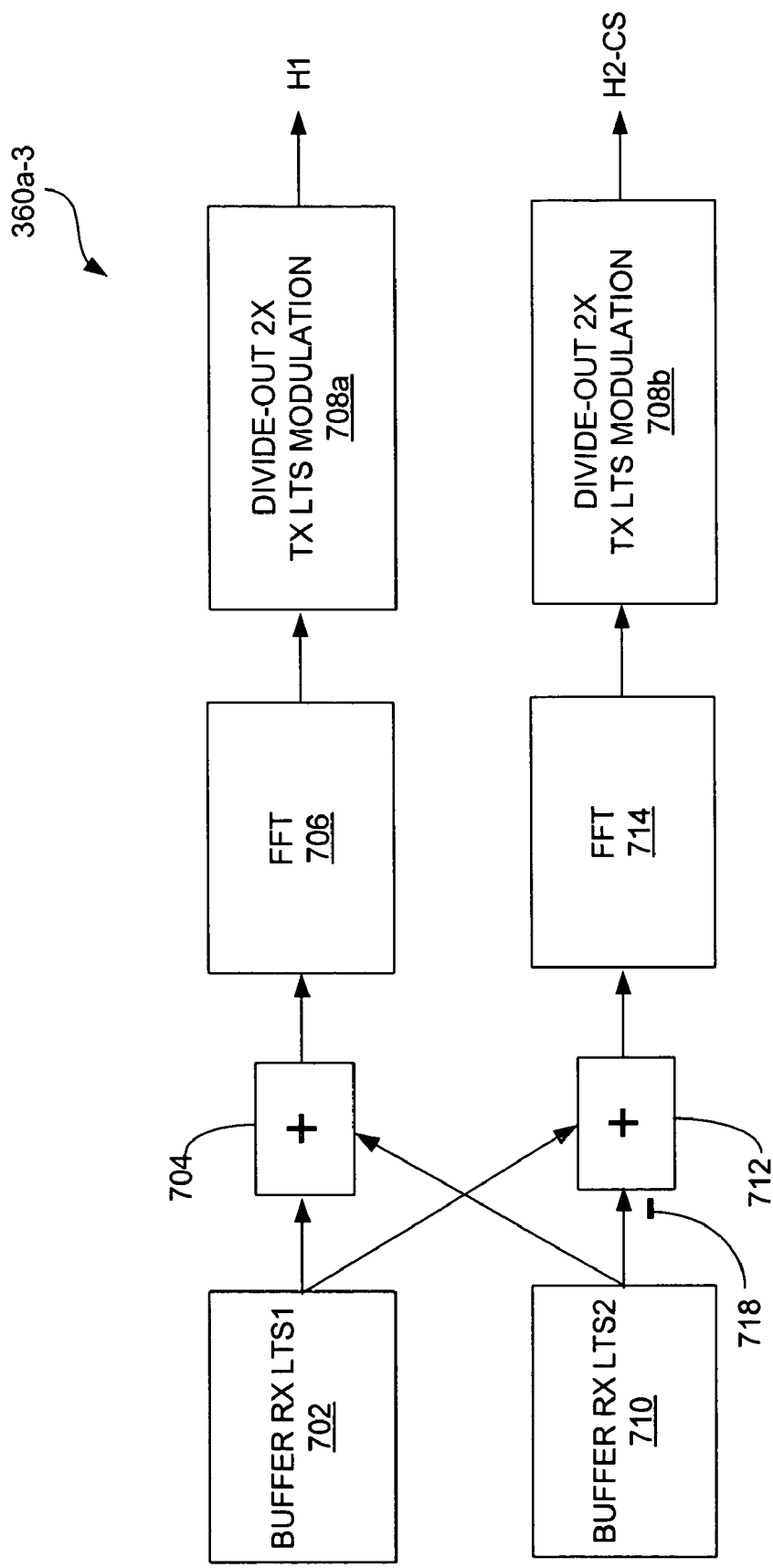
FIGS. 8A-8B are block diagrams that illustrate embodiments of receive logic of one of the receive modules shown in FIG. 6 corresponding to channel estimation with at least one channel estimate having a cyclic shift.
Figure 8B:
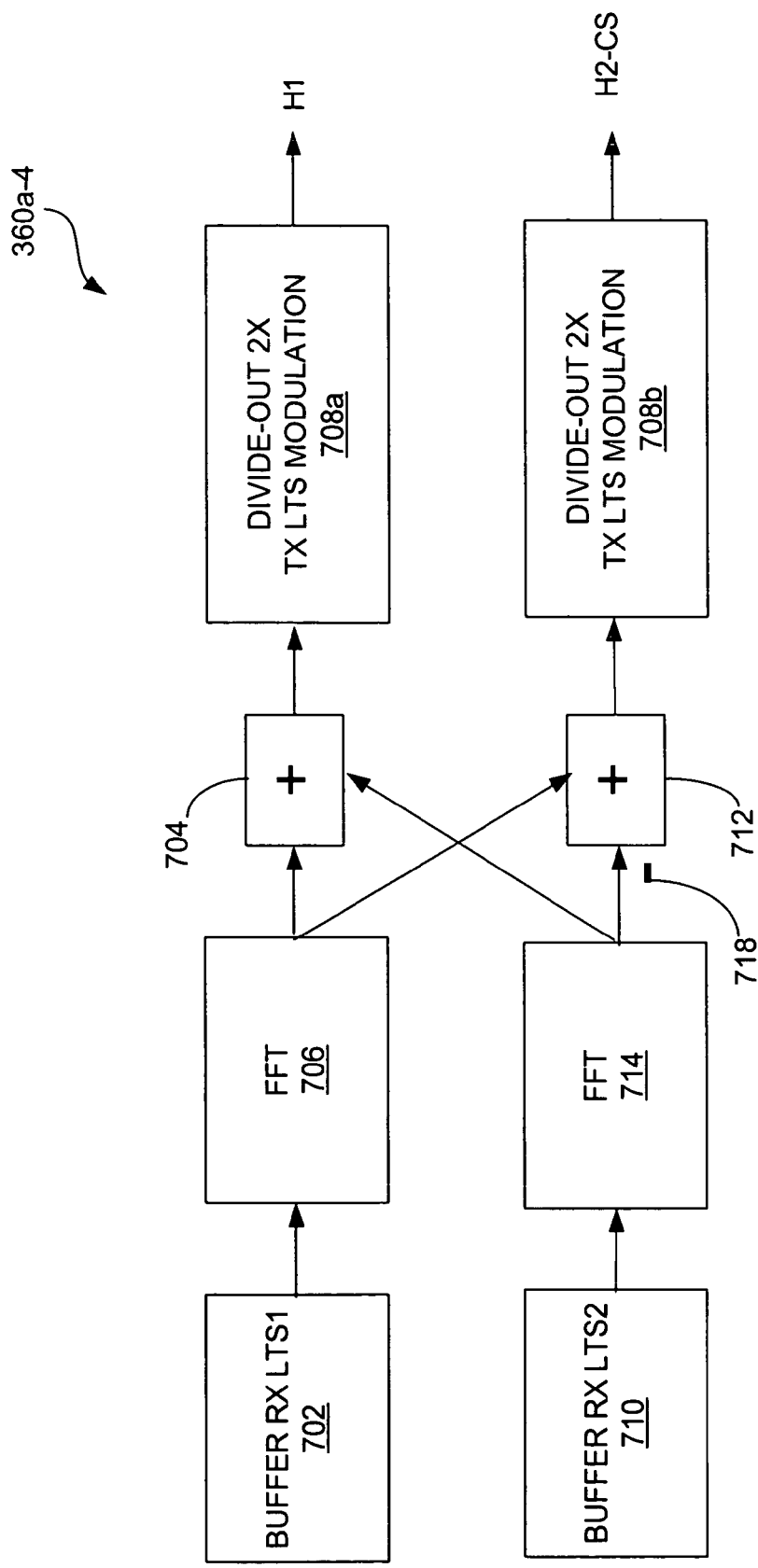

FIGS. 8A-8B are block diagrams that illustrate two embodiments of receiver logic 360a-3 and 360a-4, respectively, where channel estimate H$_2$ is cyclic shifted, and Walsh coding is performed in the time domain (FIG. 8A) and the frequency domain (FIG. 8B). With reference to FIG. 8A, the receiver logic 360a-3 comprises buffer receive (RX) LTS1 (or RLTS1 buffer) 702 and buffer receive (RX) LTS2 (or RLTS2 buffer) 710 (herein, buffers 702 and 710), adders 704 and 712, FFT modules 706 and 714, and divide-out 2X TX LTS modulation module 708a (herein module 708a) and divide-out 2X TX LTS modulation module 708b (herein module 708b). Note that modules 708a and 708b may be shared logic. The RLTS values are stored in buffers 702 and 710, provided to adders 704 and 712 (subtracted at adder 712, as shown by minus sign 718). The resultant values are transformed at FFT modules 706 and 714 to reproduce the frequency subcarriers, and the transformed values are divided out at modules 708a and 708b to arrive at the channel estimates H$_1$ and H$_2$-Cs.

Referring to FIG. 8B, an embodiment of receive logic 360a-4 is shown that performs Walsh coding in the frequency domain. As shown, components 702, 706, 704, 708a, 708b, 714, 712, and 716 are the same, but rearranged in sequence of operations such that Walsh coding occurs at adders 704 and 712 (where subtraction is represented with minus sign 718) after the FFT modules 706 and 714 transform the values to the frequency domain.

Although described in the context of 20 mega-Hertz (MHz) wide channels, it would be understood by those having ordinary skill in the art that 40 MHz wide channels will similarly apply. That is, two 20 MHz packets can be transmitted on two different frequencies. For instance, corresponding to first transmit antenna 314, the lower 20 MHz channel may have the following sequence: LTS, SF1, LTS, SF2, and then data symbols, similar to the packet sequence shown in FIG. 4D. Likewise, on the upper 20 MHz channel, the same sequence may be followed. Corresponding to second transmit antenna 316, the following sequence may be employed: LTS-CS, SF1-CS, −(LTS-CS), SF2-CS (or non-cyclic shifted), and data symbols with or without CS may be employed subsequently, similar to the sequence shown in FIG. 5D.

Note that in some embodiments, packets from a first transmitter and a second transmitter comprise segments that, in one embodiment, are time-aligned. That is, corresponding segments are transmitted in time-aligned fashion. For example, the STS segment from a packet sent from a first transmit antennas is time-aligned (e.g., has the same beginning and end time boundary, and thus duration) with a cyclic shifted STS segment corresponding to a packet transmitted from a second transmit antenna, and the LTS segment transmitted from the first transmit antennas is time aligned with the cyclic shifted LTS segment of the second transmit antennas, etc. This is made possible by sharing a common digital clock (synchronized digital circuits) for the signal generators both antennas. This is implicit in the transmitter device 302 shown in FIG. 3.

In some implementations, 56 or more subcarriers may be used for MIMO processing (e.g., IEEE 802.11n systems). That is, the MIMO portions of a packet (e.g., LTS 422b, 524b, SF2 428, 528, etc.) may have 56 (or more) subcarrier symbol waveforms. In conventional systems, legacy preamble and signal field portions (header) comprise 52 subcarriers for each symbol waveform, providing a discontinuity between legacy preamble and signal field waveforms and MIMO portion waveforms and resulting in MIMO training or channel estimating being delayed until receipt of the MIMO portions of a packet. For example, the legacy LTS with 52 subcarriers provides no training or channel estimating for the extra subcarriers found in the 56-subcarrier MIMO portion of a packet. Such conventional systems thus do not use the legacy portion for channel estimation, but rather, ignore the legacy preamble portion and perform channel estimation after the legacy signal field portion arrives. Such delayed processing wastes the information (e.g., in 802.11 systems, 8 microseconds of wasted legacy LTS) of the legacy preamble portion, since such information (e.g., the legacy LTS) is not utilized.

Embodiments described herein make use of the legacy preamble by inserting additional subcarriers to legacy preamble symbol waveforms, and in particular, to each end of the legacy LTS (e.g., 422*a*, 524*a* of FIGS. 4D and 5D, respectively) symbol waveform, resulting in 56 or more subcarriers. Optionally, extra subcarriers may be inserted in the STS and first and second signals fields (SF1 and SF2). In some embodiments, subcarriers are inserted in every LTS symbol whenever the LTS symbol appears. By inserting the additional subcarriers, receive logic 360*a* and 360*b* can completely perform channel estimation on packets 400 (FIG. 4) and 500 (FIG. 5) that use 56 or more subcarriers for the symbol waveforms. For example, the second signal field (SF2) informs the receiver module 338, 340 (e.g., receive logic 360*a*, 360*b*) the type of packet that is received, enabling the receive logic 360*a*, 360*b* to perform channel estimation. Thus, in 802.11-compliant systems, here 8 more microseconds of training (channel estimating) is provided for MIMO channel estimation compared to conventional MIMO transmitter preamble structures that fail to exploit the legacy LTS.

Further, due to the use of the legacy LTS and the nature of OFDM symbols (e.g., demodulation of one subcarrier is transparent to an orthogonal subcarrier with no resulting interference) and the retention of small advance/delay cyclic shifting as described above, legacy devices remain well-behaved in the presence of the additional subcarriers.

Additionally, since the legacy LTS is not wasted, the need for two different preambles to cover legacy and non-legacy (e.g., Greenfield) systems is obviated. Having two different preambles may require the need for additional circuitry, and may cause confusion among various devices (e.g., in overlapping basic service sets) that only expect to process one type of preamble yet encounter interference corresponding to another type of preamble. Thus, the embodiments described herein provide for a single preamble structure that unifies mixed mode (legacy and MIMO) and Greenfield implementations or protocols, with compatibility in both 20 MHz and 40 MHz (due at least in part to parallelism and symmetry) systems.

Figure 9A:
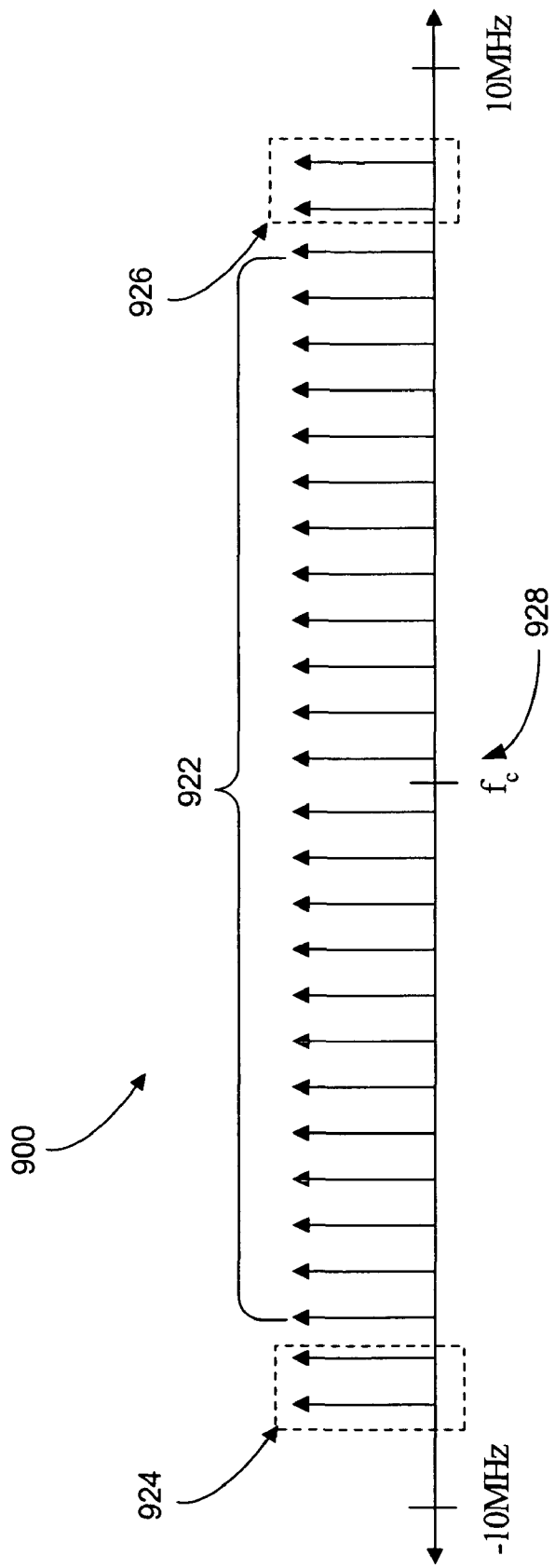
FIGS. 9A-9B illustrate exemplary extended LTS (ELTS) symbol waveforms.

FIG. 9A illustrates an exemplary extended LTS (ELTS) symbol waveform 900 for a 20 MHz packet. The ELTS symbol waveform 900 comprises a legacy portion 922 having 52 subcarriers (not all 52 are shown for simplicity), as well as two sets of additional subcarriers added at the spectral edges 924 and 926 of the legacy portion 922. As described above, subcarriers may be added by the LTS generators 303*a*, 503*a* of the waveshape logic 350*a* and 350*b*, respectively. In embodiments using 64-point IFFTs, up to 12 additional subcarriers may be added. The location of the added subcarriers is preferably at the spectral edges of the waveform 900, including at the edges adjacent to the center (at $f_c$) of the waveform.

Figure 9B:
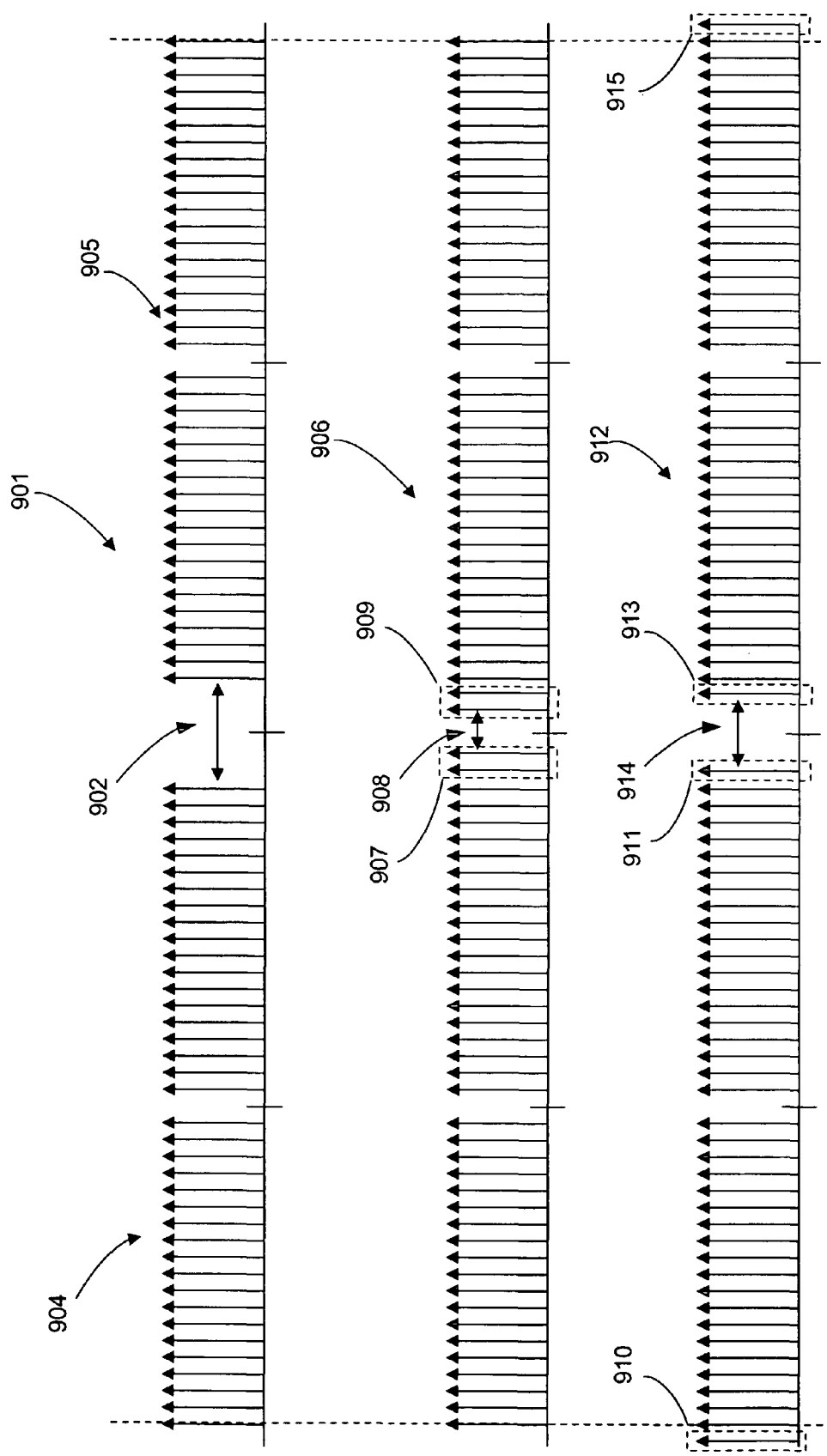

FIG. 9B illustrates a legacy LTS symbol waveform and two different extended LTS symbol waveforms, each corresponding to a 40 MHz wide packet. Waveform 901 provides a legacy LTS, which comprises a 40 MHz wide subcarrier structure matching the subcarrier structure of two 20 MHz 802.11a/g OFDM packets, whose center frequencies are spaced by 10 MHz. Waveform 906 adds extra subcarriers to the gap in the middle, on the inner spectral edges of the two 20 MHz sub-packets. Waveform 912 adds extra subcarriers to the outer and inner edges of the sub-packets. Each of these 40 MHz constructions 901, 906, 912 is advantageous to a receiver, since the similarity in subcarrier layout facilitates processing in the receiver, especially, in the instance when a 20 MHz packet is received in either the upper or lower 20 MHz channel of the 40 MHz wide bandwidth, for example.

Waveform 901 has an 11 subcarrier gap 902 between the packets. This gap 902 is introduced into the waveform because transmit and receive filters roll off with a finite rate. The receive filters are made with mostly analog components. Some margin is provided to allow a filter to be flat across the pass band and still attenuate quickly in the stop band. Typically, a $6^{th}$ order filter can be used to provide the rejection to enable the signals to stack together.

In a legacy LTS packet, 52 subcarriers are subdivided with 26 on one side 904, 26 on the other side 905, and a gap 902 in the middle. The gap 902 is created in the center of signal 901 to help eliminate (or mitigate) the dc offset and frequency errors. In the 52-subcarrier legacy LTS 901, there is an 11-subcarrier gap 902. In a 56-subcarrier signal 906, 912, the gap 908, 914 is decreased. However, the additional subcarriers are added in a manner such that there is still a sufficient gap to counter the effects of the dc offset and frequency errors. For the 56-subcarrier packets, there are the 52 subcarriers that correspond to the legacy subcarriers. There are also 4 additional subcarriers to create an extended LTS.

There are at least two options 906, 912 for adding the subcarriers. The additional subcarriers can be added at the front and back of each half of the waveform resulting in signal 912, or they can be added in the dc offset gap in the middle of the waveform resulting in signal 906. A 40 MHz packet, which has two 56-subcarrier 20 MHz packets side by side, has 102 subcarriers. In the 40 MHz packet, since there is a slight gap between the upper and lower 20 MHz packet, it is possible to fill that gap with the extra subcarriers. If the additional subcarriers 910, 911, 913, and 915 are added at the spectral edges of the each half of the 20 Mhz packets, the gap 914 for reducing dc offset and frequency errors in a 40 MHz signal is 7 subcarriers wide. If the additional subcarriers 907, 909 are added in the middle of the 40 MHz packet, the gap 908 is reduced to 3 subcarriers. By adding extra subcarriers, the data portion of the packet can be increased by as much as 10% or more.

Embodiments are described below that extend the principles above to three and four transmit channel implementations. As described above, for multiple transmit antennas, each receiver module (e.g., 338, 340) needs to estimate the multipath channel (using the magnitude and phase shift of multipath echoes) corresponding to each transmit antenna, since the deterministic preamble and header portions corresponding to each transmit antenna interfere with each other. Thus, for four transmit antennas, four multipath channels are estimated for each receive antenna (e.g., at each receive module 338, 340), one corresponding to each transmit antenna. In one embodiment using four receive antennas, this channel estimation is performed four times. The description below emphasizes the processing at a single receive antenna (e.g., 318) with the understanding that each receive antenna is to perform such processing. Thus, referring to a single receive antenna, once four multipath channels are estimated, the channel estimates can be communicated to a signal separator located in the receiver device (e.g., 304) to separate the payloads (data portion) of each transmit signal.

In general, to remove self interference on the LTSs of multiple transmit signals, the LTS portions corresponding to one or more transmit antennas are encoded multiple times and cyclically shifted to enable simple combining (e.g., add and subtract); such as through the use of Walsh coding, although other techniques may be used. Once the LTS portion from each antenna is observed, the multipath channel corresponding to each transmit antenna can be computed. Thus, in one embodiment, Walsh coding with small cyclic shifts to ensure legacy device compatibility is described for three and four transmit antenna implementations. In another embodiment, large cyclic shifts in combination with Walsh coding is described for three and four transmit antenna implementations.

FIGS. 10A and 10B are schematic diagrams that illustrate orthogonal sequences for 2-ary and 4-ary Walsh (also known as Walsh-Hadamard) coding, respectively. Referring to the 2-ary sequence 1002 of FIG. 10A, which is explained above for two transmit antenna implementations, column 1004 corresponds to the designated transmit antenna (first transmit antenna, $T_{X1}$, and second transmit antenna, $T_{X2}$). Columns 1006 and 1008 correspond to the sign ("−"representing waveform inversion, "+" representing no inversion) of the legacy LTS (LTS1, such as LTS 422a, 524a) and MIMO LTS (LTS2-4, such as LTS 422b, 524b), respectively. In one implementation, two LTS symbol waveforms corresponding to the legacy and MIMO preamble/header portions of a packet are transmitted from each transmit antenna. To enable separation of the preamble/header portions among multiple transmit antennas at a receive antenna, two LTSs (LTS1 and LTS2) are transmitted with the same sign from the first transmit antenna (+, +) and two LTSs are sent from the second transmit antenna, with the second LTS (LTS2) negated (−). As described above, this 2-ary sequence in combination with cyclic shifting enables the receive logic (e.g., 360a) to add and subtract the LTS segments and separate the two transmit antennas preamble/header signals. Note that sign rearranging is acceptable if the orthogonal property is retained.

Referring to the 4-ary sequence 1010 of FIG. 10B, column 1012 corresponds to the designated transmit antenna (first transmit antenna, $T_{X3}$, second transmit antenna, $T_{X2}$, third transmit antenna, $T_{X3}$, and fourth transmit antenna, $T_{X4}$). Columns 1014-1020 correspond to the sign ("−"representing waveform inversion, "+" representing no inversion) of the legacy LTS (LTS1) 1014 and MIMO LTSs (1016, 1018, and 1020). Extending the principles explained above, since four transmit antennas provide preamble/header portions that all interfere with each other, to implement Walsh coding, four LTSs need to be transmitted for each transmit antenna. Thus, referring to the first transmit antenna, all LTSs are transmitted with the same sign. With regard to the second transmit antenna, the LTSs have the following sign sequence: LTS1 1014 (+), LTS2 1016 (−), LTS3 1018 (+), and LTS4 1020 (−). With regard to the third transmit antenna, the LTSs have the following sign sequence: LTS1 1014 (+), LTS2 1016 (+), LTS3 1018 (−), and LTS4 1020 (−). With regard to the fourth transmit antenna, the LTSs have the following sign sequence: LTS1 1014 (+), LTS2 1016 (−), LTS3 1018 (−), and LTS4 1020 (+).

One skilled in the art would understand that variations are possible. For example, as long as the orthogonal property is retained, sign re-arrangement is possible. In general, any combination of arithmetic LTS weighting can be used which creates an orthogonal set. An orthogonal set refers to the fact that a channel from any individual transmit antenna can be computed with all interference from other transmit antennas substantially eliminated. The LTS sign pattern enables the receive logic 360a, 360b to compute each channel orthogonal to the other channels. Thus, the 4-ary sequence in combination with cyclic shifting enables the receive logic 360a, 360b to add and subtract the LTS segments and separate the four transmit antennas preamble/header signals.

Figure 11A:
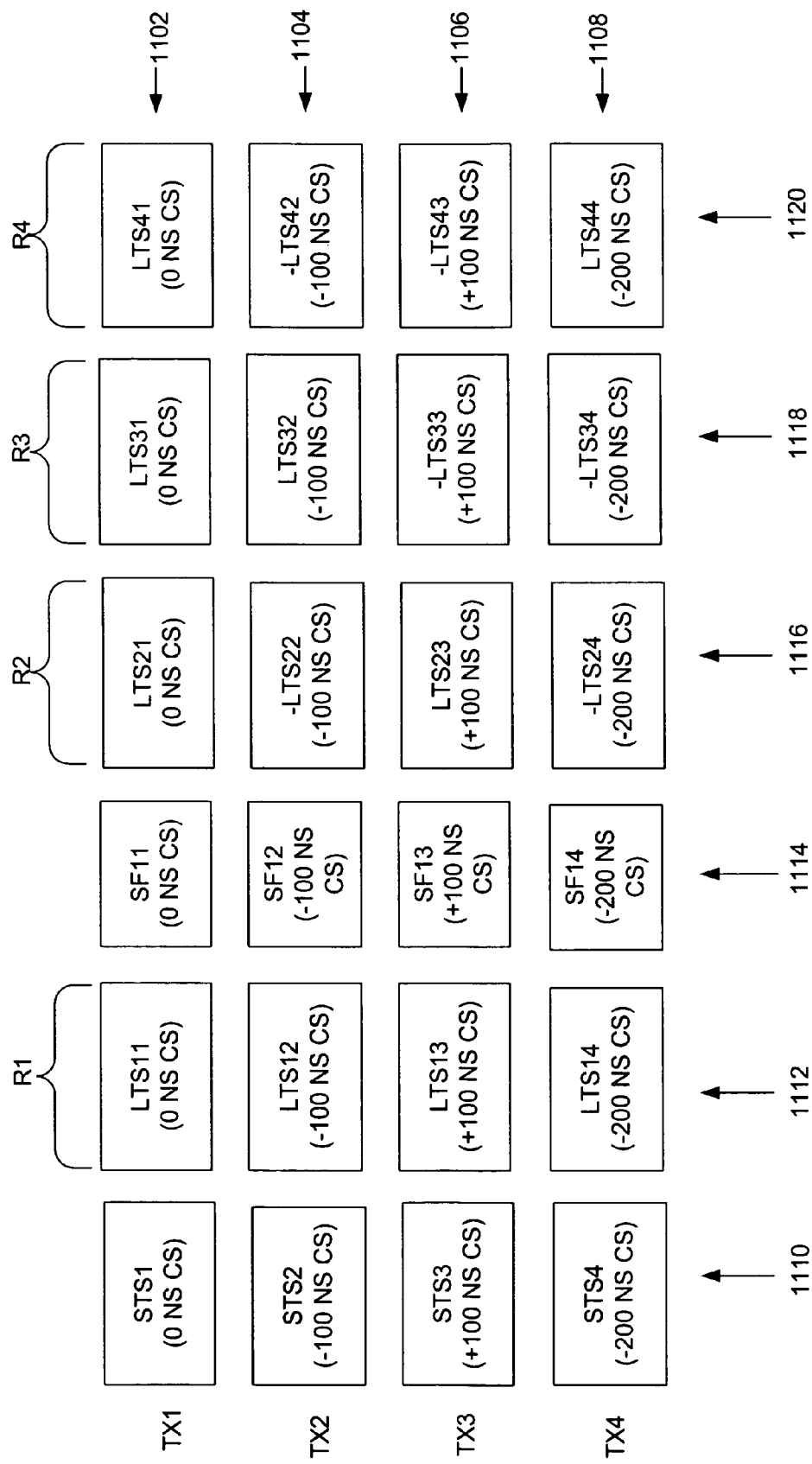
FIGS. 11A-11B illustrate an embodiment that performs preamble/header processing for a four antenna implementation using the orthogonal sequences described in FIG. 10B and Walsh processing.
Figure 11B:
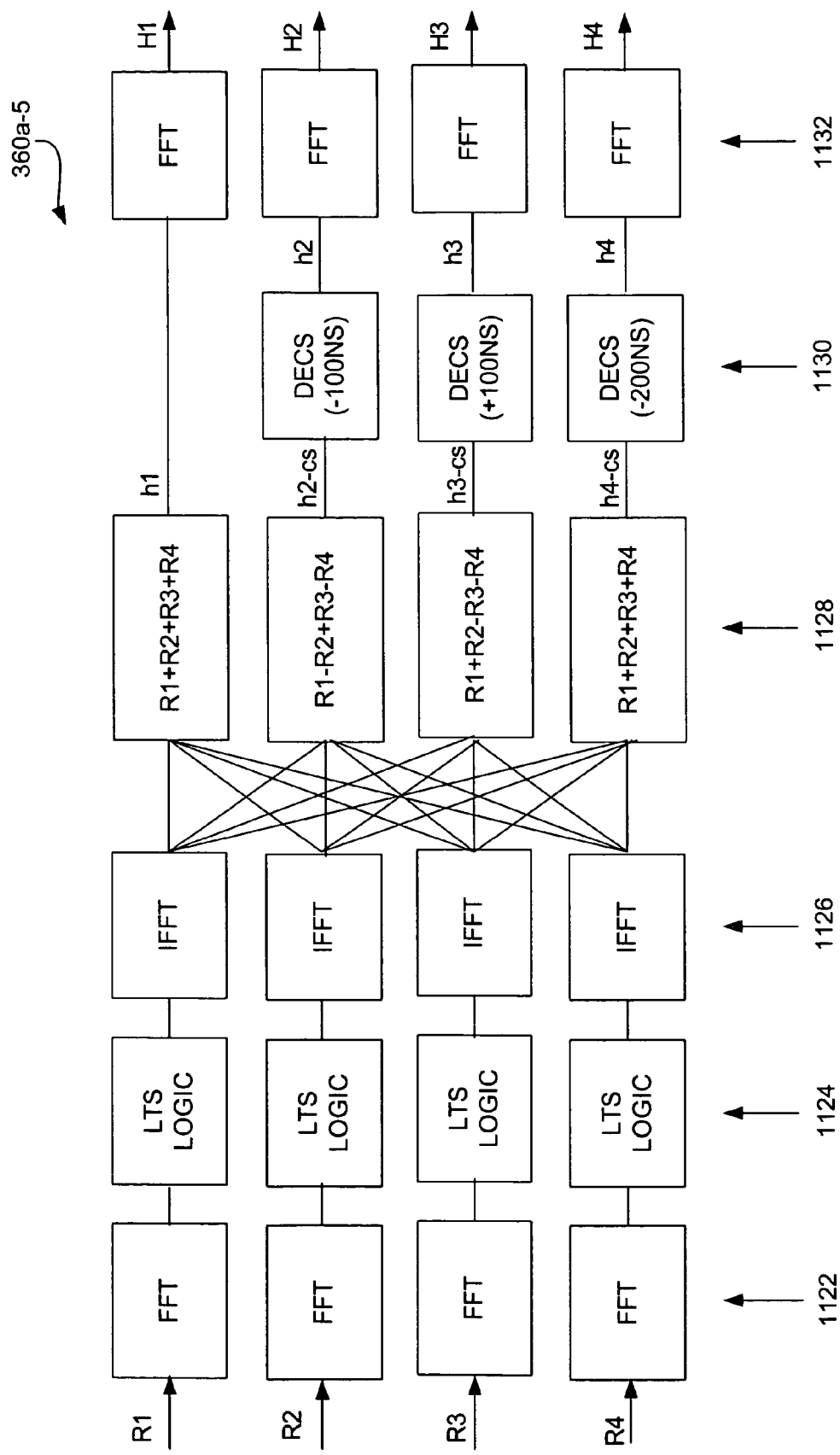

FIGS. 11A-11B illustrate a receive logic embodiment that performs preamble/header processing for a four antenna implementation using the orthogonal sequences described in FIG. 10B and Walsh processing. Exemplary cyclic shifts values and symbol durations are described and illustrated, with the understanding that other values for cyclic shifts and symbol durations may be used. FIG. 11A is a schematic diagram that shows portions of four packets 1102, 1104, 1106, and 1108 corresponding to four transmit antennas, TX1-TX4, respectively. The STS segments 1110 from each of the packets corresponds to the STS segment of the legacy preamble. $STS_1$, $STS_2$, $STS_3$, and $STS_4$ corresponds to transmit antennas TX1-TX4, respectively, and for 802.11 systems, has a duration of 8 microseconds. As one example, $STS_1$, $STS_2$, $STS_3$, and $STS_4$ may have cyclic shifts of 0 nanoseconds (ns), −100 (cyclic delay) ns, +100 (cyclic advance) ns, and −200 ns, respectively.

The LTS1 segments 1112 from each of the packets corresponds to the legacy LTSs (i.e., $LTS1_1$, $LTS1_2$, $LTS1_3$, and $LTS1_4$) of the legacy preamble, and may have cyclic shifts corresponding to the cyclic shifts of their corresponding STS (i.e., $LTS1_1$ 0 ns, $LTS1_2$ −100 ns, $LTS1_3$+100, and $LTS1_4$ −200, respectively). For 802.11 systems, a duration of the legacy LTS1 segments may be 8 microseconds (which includes 1.6 microseconds of guard interval).

Following the LTS1 segments 1112 are the SF1 segments 1114 ($SF1_1$, $SF1_2$, $SF1_3$, and $SF1_4$) of the legacy header, and likewise have cyclic shifts corresponding to the cyclic shifts of their corresponding legacy preambles. For 802.11 systems, the SF1 may be 4 microseconds. The STS 1110, LTS 1112, and SF1 1114 segments are structured in sequence and duration to provide for mixed mode compatibility (i.e., compatible with legacy 802.11a/g and MIMO 802.11 standards). Note that guard intervals, though not shown, are implied.

Following the legacy preamble/header portions are the MIMO LTS segments 1116, 1118, and 1120. Each of the MIMO LTS segments 1116, 1118, and 1120 are shown with cyclic shifts corresponding to their corresponding legacy preamble/header portions, with exemplary durations of 8 microseconds each (which includes 1.6 microseconds of guard interval). It would be understood by one having ordinary skill in the art that durations other than 8 microseconds for the MIMO LTSs may be used, such as 4 microseconds. Note that the orthogonal sequence used in this exemplary embodiment is the 4-ary sequence shown in FIG. 10B. Further, note that a MIMO signal field (SF2) is not shown, but may be inserted between the MIMO LTS segments 1116 and the SF1 segments 1114 or after the LTS4 segments 1120. The signal field SF2 conveys to the receiver module (e.g., 338) how many transmit antennas are sending signals to the receiver module receive antenna (e.g., 318), and thus enables the receive logic 360a to determine the type of orthogonal sequence to use for Walsh processing. The references R1 and R2-R4 represent time slots in which the corresponding segments (LTS1 1112 and LTS2 1116, LTS3 1118, and LTS4 1120, respectively) arrive in the receiver module 338. That is, each time slot comprises LTSs from each transmit antenna. As described above, the cyclic shifts are consistently applied across each LTS to keep the waveform the same (except for inversion) for Walsh processing, and include cyclic shifts of 0 ns, (+) and −100 ns (2 samples) and −200 ns (4 samples).

FIG. 11B is a block diagram that illustrates one embodiment of the receive logic 360a-5 to perform processing of the packets shown in FIG. 11A. It would be understood that, although described for receive logic 360a-5, a similar architecture and thus process is applied for each receive logic (e.g., 360b) corresponding to each receive antenna. In general, such baseband processing can be performed in the time domain or the frequency domain. As shown, the receive logic 360a-5 comprises first FFTs 1122, LTS logic 1124, IFFTs 1126, adders 1128, de-cyclic shift logic 1130 (equivalent to the modules 708, such as 708a, 708b, described in association with FIGS. 7A-8B), and second FFTs 1132. Fewer or additional components may be used in some embodiments, and some of the functionality of each component may be combined with other components. For instance, registers or other storage components may be used for storing intermediate values during processing, or functionality of first and second FFTs 1122 and 1132 may be combined in a single component.

In operation, LTS samples arrive at a buffer (not shown, although described as buffers 702, 710 in association with FIGS. 7A-8B) in the receive logic during the R1 time slot, R2 time slot, R3 time slot, and R4 time slot. For example, and as illustrated in FIG. 11A, the R1 time slot comprises LTS1 samples for all four transmit antennas, amounting to considerable interference among the corresponding signal samples. Similarly, the R2-R4 time slots also comprise interfering MIMO LTS symbol samples (LTS2-LTS4) from transmit antennas TX1-TX4. Referring now to the R1 time slot for simplicity in discussion, with the understanding that similar processing applies for the R2-R4 time slots, the interfering samples are stripped of the guard intervals (approximately 16 samples, e.g., at cyclic extension removal logic 612a, FIG. 6) and, in one embodiment, a 64-point FFT is performed at FFT 1122. The resulting LTS1 samples are provided to the LTS logic 1124, demodulated (e.g., remove the BPSK modulation), and the resulting frequency domain signals (corresponding to the four transmit signals) are provided to the IFFT 1126 for conversion to the time domain. Note that in some embodiments, separation may occur in the frequency domain.

Note that each OFDM symbol is fundamentally 64 samples in the time domain, and has 64-subcarriers in the frequency domain even though not all of the subcarriers are populated (e.g., some are set to zero). In fact, in the time domain, the multipath echoes that occur in wireless local area network (WLAN) environments may comprise much fewer samples than 64, and typically are constrained to fewer than 16 samples. Guard intervals placed between 64 sample symbols typically comprise 16 samples to absorb multipath transitions from one symbol to the next. Thus, when the multipath echoes are observed (e.g., amplitude and phase shifts) in the time domain, the number of samples used to describe the echoes for purposes of channel estimation is relatively small (e.g., 16 samples or less). In other words, when the IFFT processing is performed at IFFTs 1126, not all 64 samples are required, but instead approximately 16 samples corresponding to the multipath information can be used (e.g., through windowing operations whereby the first 16 samples of the multipath information are extracted from the 64 samples) and the rest of the samples discarded.

The time domain samples are combined at adders 1128 via Walsh processing similar to the processing described above in association with FIGS. 7A-8B to separate out the multipath impulse responses. Note that the operation of each adder 1128 differs, as represented by the difference in arithmetic operations among R1-R4). The output of the adders 1128 includes the channel estimate h1 (the lower case h representing the time domain) corresponding to first transmit antenna TX1, h2-cs (the cyclic shifted (cs) channel estimate corresponding to TX2), h3-cs corresponding to TX3, and h4-cs (TX4 channel estimate).

The multipath impulse responses may be provided to the decyclic shift logic 1130 to remove the cyclic shifts in the time domain. Note that similar functionality can be performed in the frequency domain. The decyclic shift logic 1130 shifts the cyclically shifted impulse responses in the direction opposite to the cyclic shift direction imposed at the transmit module (e.g., 334). In other words, the decyclic shift logic 1130 de-rotates the shifted impulse responses, resulting in channel impulse responses having no cyclic shifts in the time domain. The time-domain channel impulse responses can optionally be provided to the second FFTs 1132 to provide time domain to frequency domain conversion. The frequency domain channel impulse responses (frequency domain represented using a capital H) output from the second FFTs 1132 may be further processed in additional components of the receive module 338 (e.g., used in a signal separator to aid in the separation of the corresponding interfering payload packets).

For three transmit antenna implementations, identical processing to that described in association with a four transmit antenna implementation is employed, except the channel estimate corresponding to a fourth transmit antenna is not computed (and of course the fourth transmit signal is not transmitted). The receive logic 360a knows that the fourth transmit signal does not exist by virtue of information obtained in the MIMO signal field (SF2), which conveys to the receiver module 338 how many transmit antennas are employed for the received transmit signals.

Figure 12A:
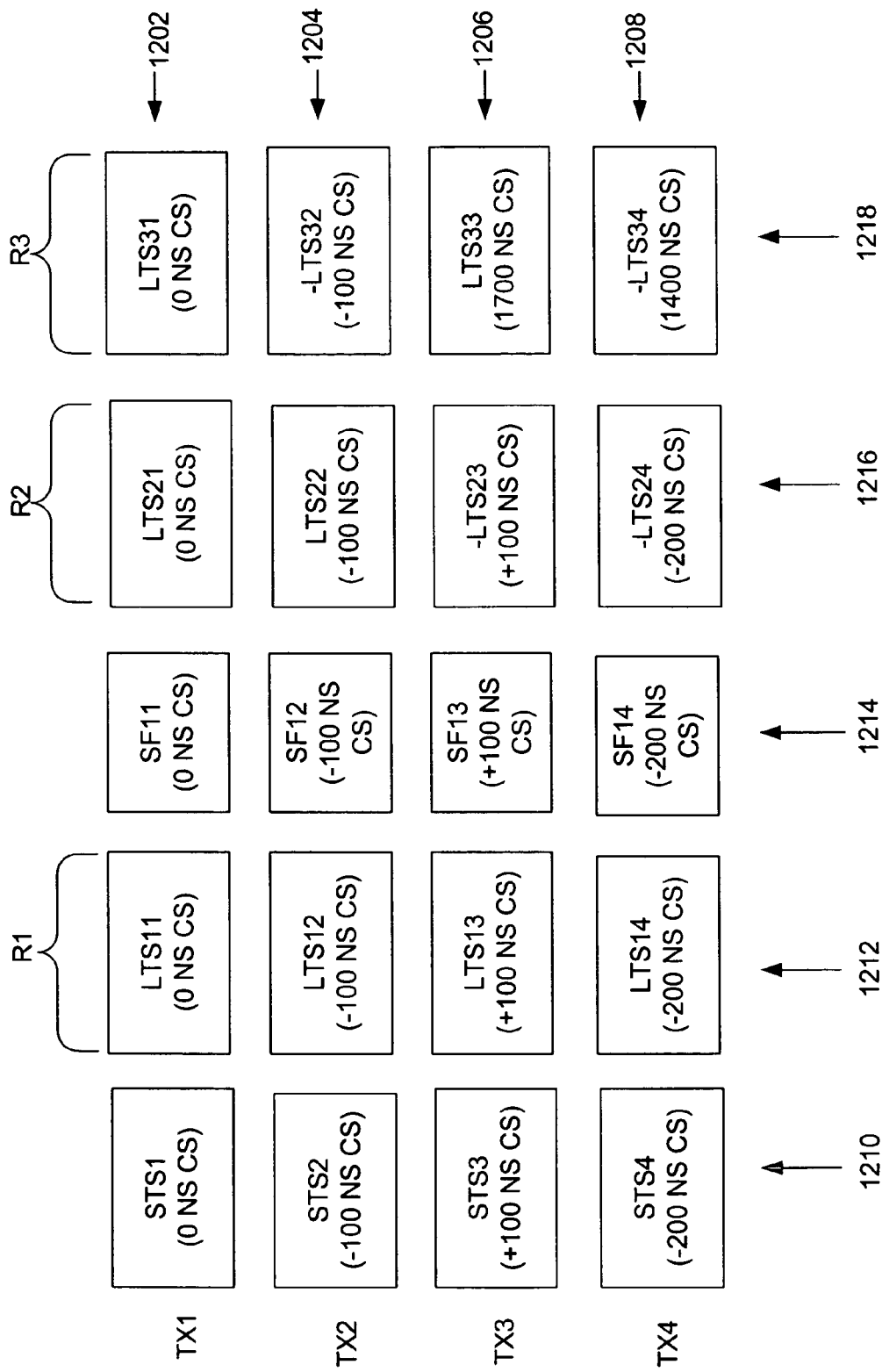
FIGS. 12A-12B illustrate an embodiment that performs preamble/header processing for a four transmit antenna implementation using a combination of Walsh processing and large cyclic shifts.
Figure 12B:
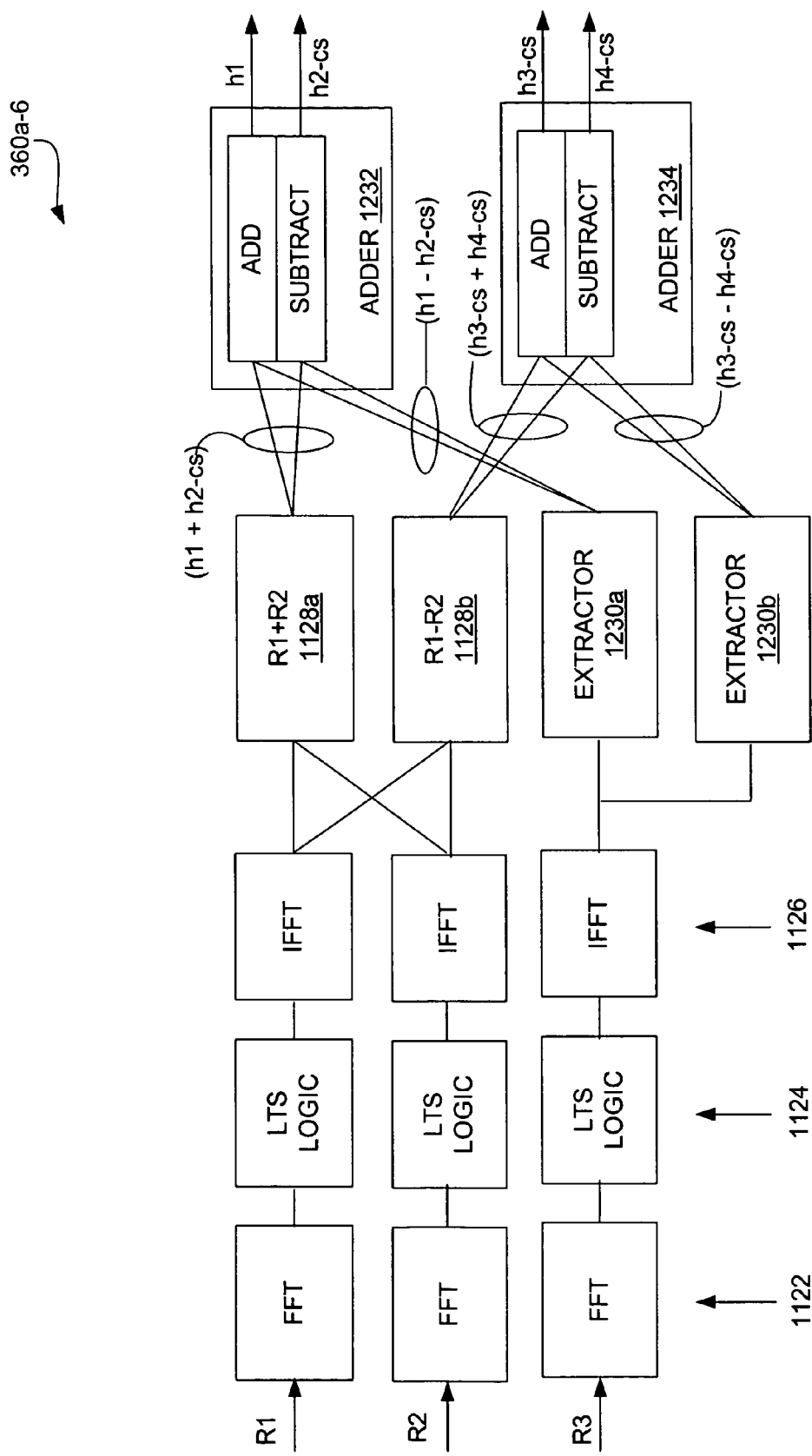

FIGS. 12A-12B illustrate a receive logic embodiment that performs preamble/header processing for a four transmit antenna implementation using a combination of Walsh processing and large cyclic shifts. Note that the sign arrangement (orthogonal sequence) is different from the sequence shown in FIG. 10B, largely due to the fact that a combination of Walsh processing and large cyclic shifts is used to remove the transmit antenna cross interference. Walsh processing implemented in this embodiment uses a 2-ary orthogonal sequence to provide a first level of separation to recover pairs of interfering LTSs. Large cyclic shift processing in this embodiment provides a second level of LTS separation, recovering individual LTSs without any remaining interference. Thus, the combination of orthogonal arithmetic weighting (e.g., Walsh processing) and large (compared to the multipath time spread) cyclic shifts can be used to create a composite orthogonal set, and variations consistent with this main theme are contemplated.

Further, as indicated above, large cyclic shifts are shifts larger than the multipath spread (or guard interval 16 samples). In one embodiment, the largest cyclic shift that can be implemented is ½ (0.5) of an FFT span (e.g., 1600 nanoseconds or 32 samples for IEEE 802.11, 64-point FFTs). In some embodiments, any cyclic shift value between the lower guard interval bound (16 samples) and the upper bound of the 0.5 FFT span (i.e., after the guard interval has been removed) may be considered a large cyclic shift. Using such embodiments, the amount of MIMO LTSs used can be reduced (e.g., from four to three per packet), which may result in faster processing times. Exemplary cyclic shifts values and symbol durations are described and illustrated, with the understanding that other values for cyclic shifts and symbol durations may be used:

FIG. 12A is a schematic diagram that shows portions of four packets 1202, 1204, 1206, and 1208 corresponding to four transmit antennas, TX1-TX4, respectively. The STS segments 1210 from each of the packets corresponds to the STS segment of the legacy preamble. $STS_1$, $STS_2$, $STS_3$, and $STS_4$ corresponds to transmit antennas TX1-TX4, respectively, and for 802.11 systems, has a duration of 8 microseconds. As one example, $STS_1$, $STS_2$, $STS_3$, and $STS_4$ may have cyclic shifts of 0 nanoseconds (ns), −100 (cyclic delay) ns, +100 (cyclic advance) ns, and −200 ns, respectively. Guard intervals, though not shown, are implied. The LTS1 segments 1212 from each of the packets corresponds to the legacy LTS1s (i.e., $LTS1_1$, $LTS1_2$, $LTS1_3$, and $LTS1_4$) of the legacy preamble, and may have cyclic shifts corresponding to the cyclic shifts of their corresponding STS (i.e., $LTS1_1$ 0 ns, $LTS1_2$ −100 ns, $LTS1_3$+1 00, and $LTS1_4$ −200, respectively). For 802.11 systems, a duration of the legacy LTS1 segments may be 8 microseconds. Following the LTS1 segments 11112 are the SF1 segments 1214 ($SF1_1$, $SF1_2$, $SF1_3$, and $SF1_4$) of the legacy header, and likewise have cyclic shifts corresponding to the cyclic shifts of their corresponding legacy preambles. For 802.11 systems, the SF1 may have a duration of 4 microseconds. The STS 1210, LTS1 1212, and SF 11214 segments are structured in sequence and duration to provide for mixed mode compatibility (i.e., compatible with legacy 802.11 a/g and MIMO 802.11 standards).

Following the legacy preamble/header portions are the MIMO LTS segments 1216 (LTS2) and 1218 (LTS3). Note that the LTS and ELTS subcarrier structures described in association with FIG. 12 are the same as those described for FIGS. 4, 5, 10, and 11. The LTS2 segments 1216 are shown with cyclic shifts corresponding to their corresponding legacy preamble/header portions, with exemplary durations of 8 microseconds, although variations are possible (e.g., 4 microseconds). The LTS3 segments 1218 are shown with cyclic shifts for the first and second transmit antenna that mirror the cyclic shifts of their corresponding preamble/header symbols, but for LTS segments corresponding to the third and fourth transmit antenna, have large cyclic shifts (1600 ns modified by the small cyclic shift occurring to the legacy LTS (during the R1 time slot), resulting in one example as 1700 ns for LTS3 and 1400 ns for LTS4). One exemplary duration for the LTS2 segments can be 8 microseconds, although it would be understood by one having ordinary skill in the art that durations other than 8 microseconds for the MIMO LTSs in general may be used, and that different cyclic shifts may be employed. Further, note that a MIMO signal field (SF2) is not shown, but may be inserted between the MIMO LTS segments 1216 and the SF1 segments 1114 or after the LTS segments 1218. The signal field SF2 conveys transmit antenna quantity information, among other information, to the receiver module 338, and thus enables the receive logic to determine the required processing. The references R1-R3 represents time slots in which the corresponding LTS symbols arrive in the receiver module 338.

In general, three LTS segments are transmitted from each transmit antenna. The receiver module 338 extracts R1-R3 to obtain the four multipath channels. For R1 and R2, 2-ary orthogonal sequence processing is employed, as described above, which results in partial separation of the preamble/header portions of the transmit signals. With regard to R3, the first transmit antenna sends an LTS at with no cyclic shift. The second transmit antenna sends an LTS with a −100 ns cyclic shift. The third transmit antenna sends an LTS with a large cyclic shift (1600 ns+100 ns (R1)=1700 ns). Similarly, the fourth transmit antenna sends an LTS with a large cyclic shift (1600 ns−200 ns (R1)=1400 ns). It is noted that a 1600 ns cyclic shift is equivalent to half of the 64 samples, or 32 samples (half an OFDM symbol minus the guard symbol). The applied cyclic shift is thus the 1600 ns cyclic shift modified by the cyclic shift imposed on the legacy LTS.

FIG. 12B is a block diagram that illustrates one embodiment of the receive logic 360*a*-6 to perform processing of the packets shown in FIG. 12A. It would be understood that, although described for receive logic 360*a*-6, a similar architecture and thus process is applied for each receive logic 360*a* (e.g., receive logic 360*b* corresponding to second receive antenna 320) corresponding to each receive antenna. In general, such baseband processing can be performed in the time domain or the frequency domain. As shown, the receive logic 360*a*-6 comprises FFTs 1122, LTS logic 1124, IFFTs 1126, first adders 1228*a*, 1228*b*, extractors 1230*a*, 1230*b*, second adders 1232, and third adders 1234. Note that fewer or more components may be used, or in some embodiments, functionality of some of these components may be combined. As the components 1122-1126 and the associated processing have been described in association with FIG. 11B, discussion of the same is omitted for brevity except where noted.

Referring to first adders 1128*a*, 1128*b* and R1 and R2 processing, Walsh processing using 2-ary orthogonal sequencing is implemented for R1 and R2, with the resulting pairs of (h1+h2-cs) and (h3-cs+h4-cs) provided at their respective output. With regard to R3, an IFFT is performed at IFFT 1126 corresponding to R3. Because of the large cyclic shifts implemented on the LTSs corresponding to the third and fourth transmit antennas, the extractor 1230*a* extracts the first 16 samples to provide h1-cs and h2-cs (i.e., h1-h2-cs), and the extractor 1230*b* extracts the second 16 samples to provide h3-cs and h4-cs (i.e., h3-cs-h4-cs). There is no overlap between the pairs h1 and h2-cs and h3-cs and h4-cs due to the zero or small cyclic shifts of the first and second transmit antenna and the large cyclic shifts associated with the third and fourth transmit antenna. The pairs are added/subtracted at respective second and third adders 1232 and 1234, with the resulting individual impulse responses (h1, h2-cs, h3-cs, and h4-cs). Further processing may be employed to optionally de-cyclic shift the impulse responses and convert to the frequency domain as explained in association with FIGS. 11A-11B.

Process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 13:
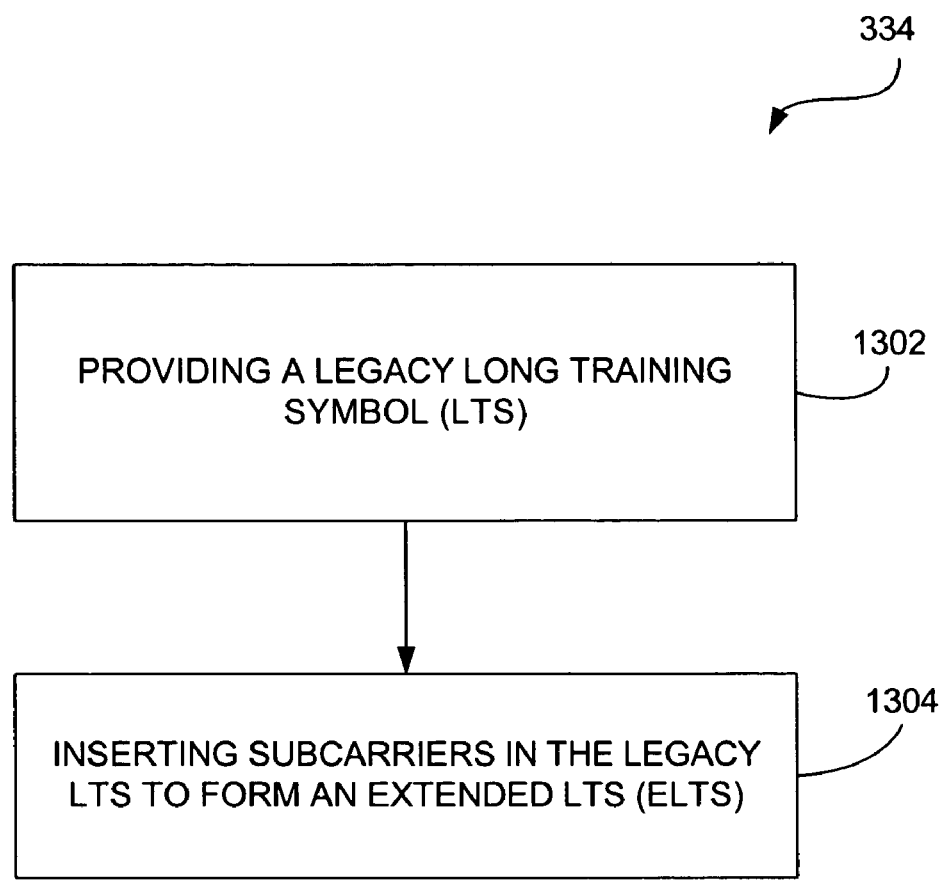
FIGS. 13 and 14 are flow diagrams that illustrate packet processing method embodiments on the transmit side.

As will be appreciated from the above description, one embodiment of a packet processing method 334 (or similarly 336) comprises, as illustrated in FIG. 13, providing a legacy long training symbol (LTS) (1302) and inserting subcarriers in the legacy LTS to form an extended LTS (ELTS) (1304).

Figure 14:
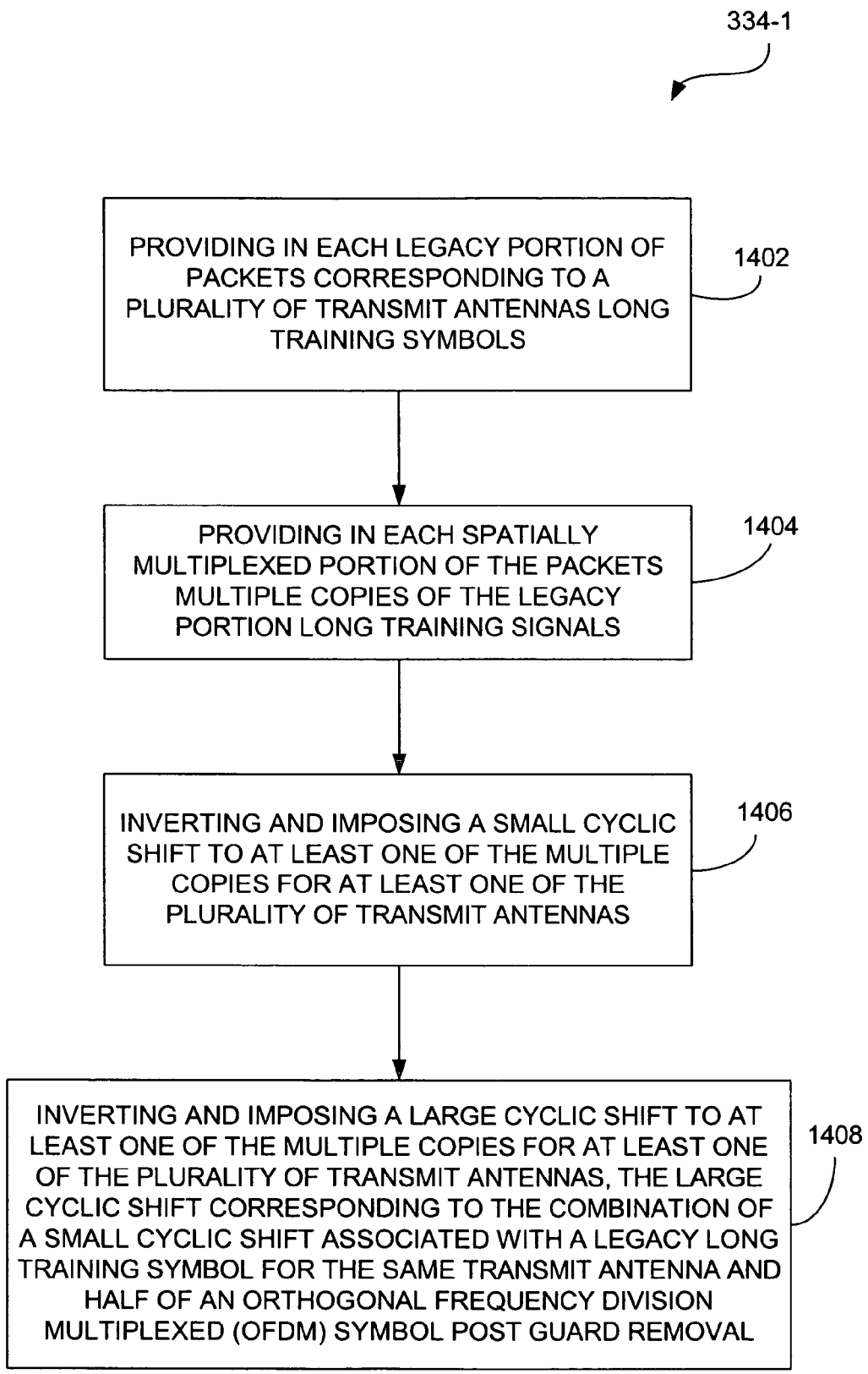

Another embodiment of a packet processing method 334-1 (or similarly 336) comprises, as illustrated in FIG. 14, providing in each legacy portion of packets corresponding to a plurality of transmit antennas long training symbols (1402), providing in each spatially multiplexed portion of the packets multiple copies of the legacy portion long training signals (1404), inverting and imposing a small cyclic shift to at least one of the multiple copies for at least one of the plurality of transmit antennas (1406), and inverting and imposing a large cyclic shift to at least one of the multiple copies for at least one of the plurality of transmit antennas, the large cyclic shift corresponding to the combination of a small cyclic shift associated with a legacy long training symbol for the same transmit antenna and half of an orthogonal frequency division multiplexed (OFDM) symbol (1408).

Figure 15:
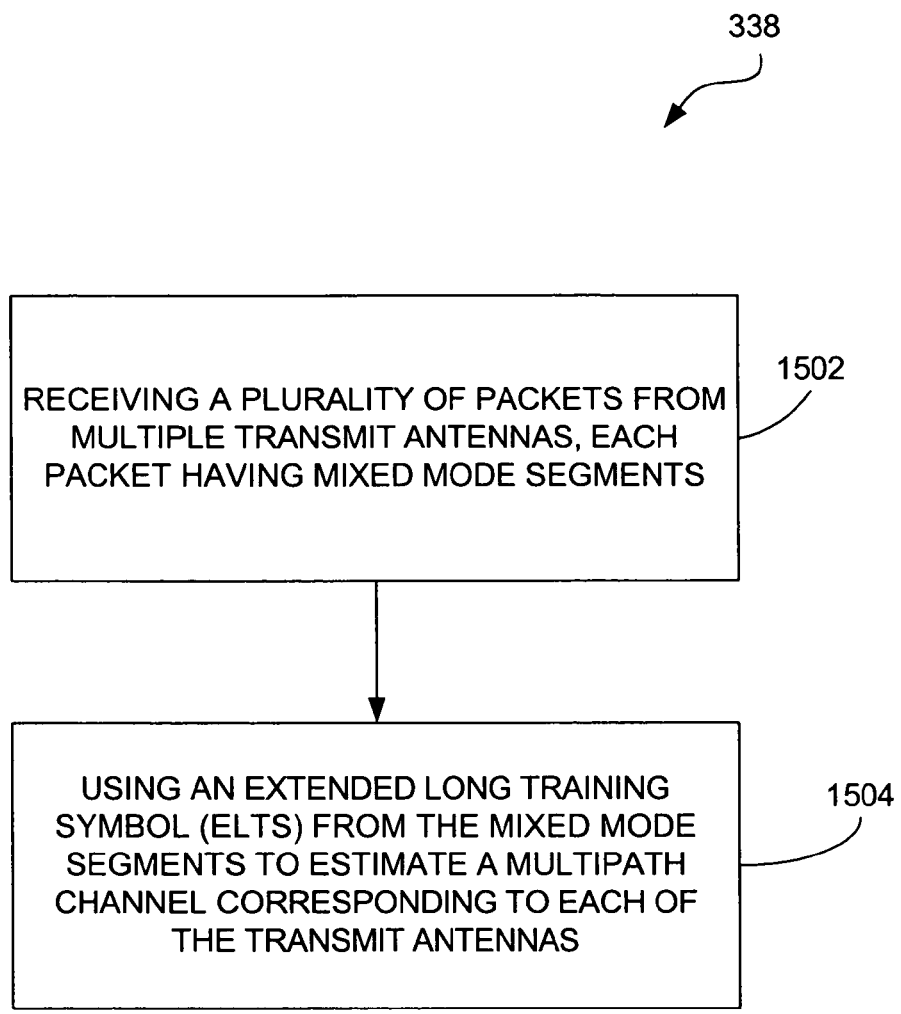
FIGS. 15 and 16 are flow diagrams that illustrate packet processing method embodiments on the receiver side.

An embodiment of a packet processing method 338 (or 340) comprises, as shown in FIG. 15, receiving a plurality of packets from multiple transmit antennas, each packet having mixed mode segments (1502), and using an extended long training symbol (ELTS) from the mixed mode segments to estimate a multipath channel corresponding to each of the transmit antennas (1504).

Figure 16:
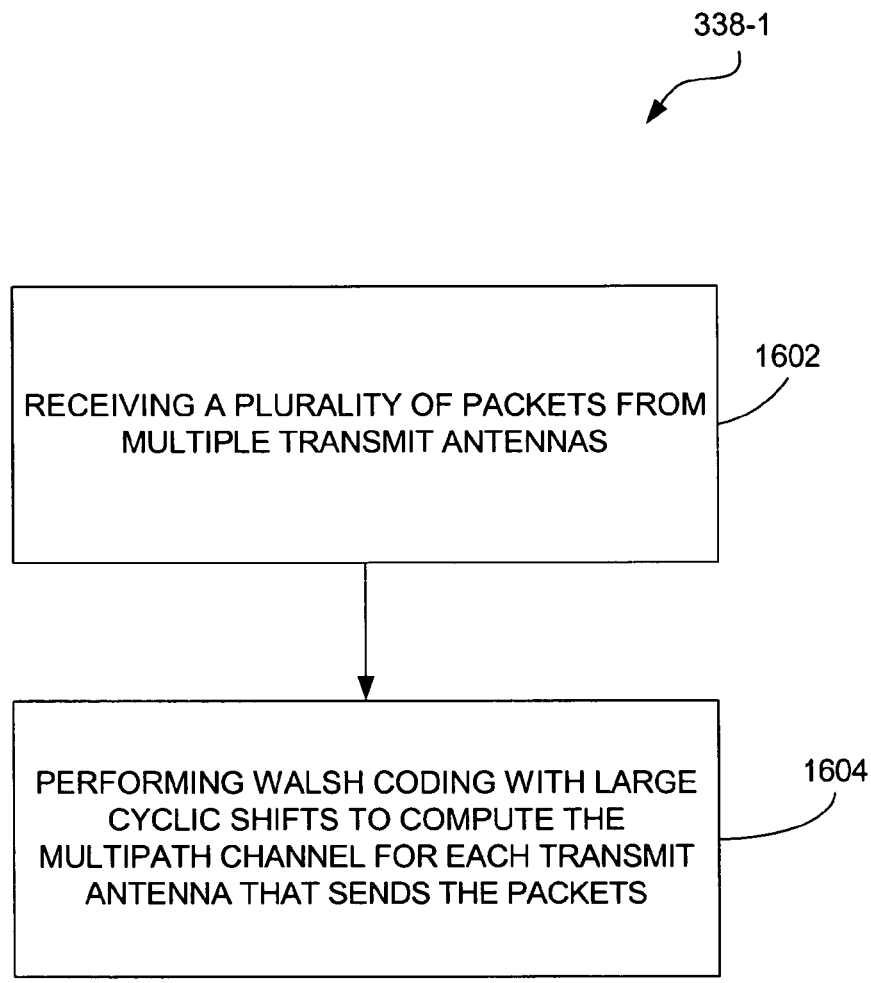

Another packet processing embodiment 338-1 (or 340), shown in FIG. 16, comprises receiving a plurality of packets from multiple transmit antennas (1602), and performing Walsh coding with large cyclic shifts to compute the multipath channel for each transmit antenna that sends the packets (1604).

It should be emphasized that the above-described embodiments of the present disclosure, particularly, any "preferred" embodiments, are merely possible examples of implementations, merely set forth for a clear understanding of the principles of the disclosed systems and methods. Many variations and modifications may be made to the above-described embodiment(s) without departing substantially in scope. All such modifications and variations are intended to be included herein within the scope of this disclosure.

What is claimed:

1. A method, comprising:
receiving a plurality of packets from multiple transmit antennas, each packet having mixed mode segments; and
estimating a multipath channel at a receive processor for each of the multiple transmit antennas based on an extended long training symbol (ELTS) from the mixed mode segments.

2. The method of claim 1, wherein estimating comprises performing Walsh coding with 2-ary orthogonal sequencing to determine the multipath channel for each transmit antenna of the multiple transmit antennas that sends at least some of the plurality of packets.

3. The method of claim 1, wherein estimating comprises performing Walsh coding with 4-ary orthogonal sequencing to determine the multipath channel for each transmit antenna of the multiple transmit antennas that sends at least some of the plurality of packets.

4. The method of claim 1, wherein estimating comprises performing Walsh coding with large cyclic shifts to determine the multipath channel for each transmit antenna of the multiple transmit antennas that sends at least some of the plurality of packets.

5. The method of claim 4, wherein the large cyclic shifts comprise shifts greater than a multipath time spread.

6. The method of claim 4, wherein the large cyclic shifts comprise a combination of a cyclic shift value corresponding to half of an orthogonal frequency division multiplexed (OFDM) symbol and a small cyclic shift corresponding to the ELTS in the mixed mode segments.

7. The method of claim 1, wherein the ELTS from legacy and spatial multiplexing sections of a preamble and header portion of at least one packet in the plurality of packets.

8. The method of claim 7, wherein the ELTS is in inverted form.

9. A system, comprising:
a receive processor, configured to communicate with at least one of a plurality of transmit antennas, the receive processor comprising:
receive logic, comprising digital circuitry, configured to estimate a multipath channel for each transmit antenna of the plurality of transmit antennas using an extended long training symbol (ELTS) from each mixed mode segment in a plurality of packets received from the at least one transmit antenna and to communicate the estimate.

10. The system of claim 9, wherein the logic is configured to perform Walsh coding with 2-ary orthogonal sequencing to determine the multipath channel for each transmit antenna that sends at least some of the plurality of packets.

11. The system of claim 9, wherein the logic is configured to perform Walsh coding with 4-ary orthogonal sequencing to determine the amplitude of the multipath channel for each transmit antenna that sends at least some of the plurality of packets.

12. The system of claim 9, wherein the logic is configured to perform Walsh coding with large cyclic shifts to determine the multipath channel for each transmit antenna that sends at least some of the plurality of packets.

13. The system of claim 12, wherein the large cyclic shifts comprise shifts greater than a multipath time spread.

14. The system of claim 12, wherein the large cyclic shifts comprise a combination of a cyclic shift value corresponding to half of an orthogonal frequency division multiplexed (OFDM) symbol and a small cyclic shift corresponding to the ELTS in the mixed mode segments.

15. The system of claim 9, wherein the logic is configured to use the ELTS from legacy and spatial multiplexing sections of a preamble and header portion of at least one packet in the plurality of packets.

16. The system of claim 15, wherein the logic is configured to use the ELTS in inverted form.

17. A system, comprising:
means for receiving a plurality of packets from multiple transmit antennas, each packet having mixed mode segments; and
means for estimating a multipath channel for each transmit antenna of the multiple transmit antennas using an extended long training symbol (ELTS) from the mixed mode segments.

18. The system of claim 17, wherein the means for estimating comprises means for performing Walsh coding with 2-ary orthogonal sequencing to determine the multipath channel for each other transmit antenna that sends at least some of the plurality of packets.

19. The system of claim 17, wherein the means for estimating comprises means for performing Walsh coding with 4-ary orthogonal sequencing to determine the phase of the multipath channel for each other transmit antenna that sends at least some of the plurality of packets.

20. The system of claim 17, wherein the means for estimating comprises means for performing Walsh coding with large cyclic shifts to determine the phase of the multipath channel for each other transmit antenna that sends at least some of the plurality of packets.

21. A method, comprising:
receiving a plurality of packets from multiple transmit antennas at a receive processor; and
at the receive processor, performing Walsh coding with large cyclic shifts to determine a multipath channel for each transmit antenna of the multiple transmit antennas that sends at least some of the plurality of packets,
wherein the large cyclic shifts comprise a combination of a cyclic shift value corresponding to half of an orthogonal frequency division multiplexed (OFDM) symbol and a small cyclic shift corresponding to the ELTS in the mixed mode segments.

22. The method of claim 21, wherein the large cyclic shifts comprise shifts greater than a multipath time spread.

23. A system, comprising a receive processor, configured to communicate with at least one of a plurality of transmit antennas, the receive processor comprising:
receive logic, comprising digital circuitry configured to determine a phase and an amplitude of a multipath channel for each transmit antenna of a plurality of transmit antennas by performing Walsh coding with large cyclic shifts and to communicate the phase and amplitude, wherein the large cyclic shifts comprise a combination of a cyclic shift value corresponding to half of an orthogonal frequency division multiplexed (OFDM) symbol and a small cyclic shift corresponding to the ELTS in the mixed mode segments.

24. The system of claim 23, wherein the large cyclic shifts comprise shifts greater than a multipath time spread.

25. A method, comprising:

generating long training symbols (LTSs) for each legacy portion of packets corresponding to a plurality of transmit antennas;

generating a plurality of copies of legacy portion LTSs for each spatially multiplexed portion of the packets;

inverting and imposing a small cyclic shift to at least one copy of the plurality of copies of legacy portion LTSs for at least one transmit antenna of the plurality of transmit antennas; and inverting and imposing a large cyclic shift to at least one copy of the plurality of copies of legacy portion LTSs for the at least one transmit antenna of the plurality of transmit antennas, the large cyclic shift corresponding to the combination of the small cyclic shift associated with the at least one transmit antenna and half of an orthogonal frequency division multiplexed (OFDM) symbol post guard removal.

26. A system, comprising:

a transmit processor, comprising:

waveshape logic, comprising software stored in a memory, the software configured to, upon execution by the transmit processor, cause the transmit processor to perform operations comprising:

generate long training symbols (LTSs) for each legacy portion of packets corresponding to a plurality of transmit antennas, generate a plurality of copies of legacy portion LTSs for each spatially multiplexed portion of the packets, invert and impose a small cyclic shift to at least one copy of the plurality of copies of legacy portion LTSs for at least one transmit antenna of the plurality of transmit antennas, and invert and impose a large cyclic shift to at least one copy of the plurality of copies of legacy portion LTSs for the at least one transmit antenna of the plurality of transmit antennas, the large cyclic shift corresponding to the combination of the small cyclic shift for the at least one transmit antenna and half of an orthogonal frequency division multiplexed (OFDM) symbol post guard removal.

27. The system of claim 26, further comprising the plurality of transmit antennas.

28. The system of claim 27, wherein the plurality of transmit antennas comprise four transmit antennas.

29. A system, comprising:

a transmit processor, comprising:

waveshape logic, comprising at least one application specific integrated circuit (ASIC), the waveshape logic configured to:

generate long training symbols (LTSs) in each legacy portion of packets corresponding to a plurality of transmit antennas, generate a plurality of copies of legacy portion LTSs in each spatially multiplexed portion of the packets, invert and impose a small cyclic shift to at least one copy of the plurality of copies of legacy portion LTSs for at least one transmit antenna of the plurality of transmit antennas, and invert and impose a large cyclic shift to at least one copy of the plurality of copies of legacy portion LTSs for the at least one transmit antenna of the plurality of transmit antennas, the large cyclic shift corresponding to the combination of the small cyclic shift associated with the at least one transmit antenna and half of an orthogonal frequency division multiplexed (OFDM) symbol post guard removal, thereby generating a packet structure; and a radio, configured to transmit the packet structure.

30. The system of claim 29, further comprising the plurality of transmit antennas.

31. The system of claim 30, wherein the plurality of transmit antennas comprises four transmit antennas.

* * * * *

UNITED STATES PATENT AND TRADEMARK OFFICE
CERTIFICATE OF CORRECTION

| | | |
|---|---|---|
| PATENT NO. | : 8,077,592 B2 | Page 1 of 1 |
| APPLICATION NO. | : 11/186260 | |
| DATED | : December 13, 2011 | |
| INVENTOR(S) | : Webster et al. | |

It is certified that error appears in the above-identified patent and that said Letters Patent is hereby corrected as shown below:

Title Page, Item (63), under "Related U.S. Application Data", in Column 1, Line 2, delete "2005." and insert -- 2005, now U.S. Pat. No. 7,643,453. --, therefor.

In Column 1, Line 10, delete "2005," and insert -- 2005, now U.S. Pat. No. 7,643,453, --, therefor.

In Column 7, Line 12, delete "br" and insert -- or --, therefor.

In Column 20, Line 56, delete "used:" and insert -- used. --, therefor.

In Column 21, Line 5, delete "1 00," and insert -- 100, --, therefor.

In Column 21, Line 7, delete "11112" and insert -- 1112 --, therefor.

In Column 21, Line 12, delete "SF 11214" and insert -- SF1 1214 --, therefor.

Signed and Sealed this
Thirty-first Day of July, 2012

David J. Kappos
*Director of the United States Patent and Trademark Office*